(12) United States Patent
Brunsting et al.

(10) Patent No.: US 6,505,164 B1
(45) Date of Patent: *Jan. 7, 2003

(54) METHOD AND APPARATUS FOR SECURE VENDOR ACCESS TO ACCOUNTS PAYABLE INFORMATION OVER THE INTERNET

(75) Inventors: Carole A. Brunsting, Houston, TX (US); Paul L. Lurix, Jr., Brookshire, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,093

(22) Filed: Sep. 19, 1997

(51) Int. Cl.[7] .................................. G06F 17/60
(52) U.S. Cl. ............................. 705/1; 705/40
(58) Field of Search ................ 705/17, 18, 21, 705/1, 40, 54, 52; 707/10; 713/190, 202, 200; 235/379; 380/30

(56) References Cited

U.S. PATENT DOCUMENTS

| | | | |
|---|---|---|---|
| 4,894,857 A | * | 1/1990 | Szlam et al. ............... 379/67 |
| 5,699,528 A | * | 12/1997 | Hogan ......................... 705/40 |
| 5,708,780 A | * | 1/1998 | Levergood et al. ..... 395/200.59 |
| 5,774,670 A | * | 6/1998 | Montulli ................. 395/200.57 |
| 5,802,518 A | * | 9/1998 | Karaev et al. ................ 707/9 |

FOREIGN PATENT DOCUMENTS

JP 410 254 696 A * 9/1998

OTHER PUBLICATIONS

Higgins, Kelly Hackson; "Dare to Webify Your Back Office"; Sep. 1, 1997; InternetWeek; p.83, DialogWeb copy pp. 1–7.*

Wilson, Tim; "A Way to Webify Legacy Data", Sep. 15, 1997; InternetWeek, p. 1 DialogWeb copy pp. 1–3.*

* cited by examiner

Primary Examiner—Thomas A. Dixon
(74) Attorney, Agent, or Firm—Akin, Gump, Strauss, Hauer & Feld, LLP

(57) ABSTRACT

Improved techniques for remotely accessing account information through the Internet are disclosed. The remote access techniques provide security measures so that unauthorized access is unlikely even though the Internet is utilized. Assuming access is authorized, the requested account information can be acquired and then presented to a requester via the Internet in a format suitable for the type of the requested account information. In addition, as an additional security measure, the invention may also filter out any account holder identifying information from the requested account information such that the account information presented to the requester does not identify the account holder.

3 Claims, 25 Drawing Sheets

METHOD AND APPARATUS FOR SECURE VENDOR ACCESS TO ACCOUNTS PAYABLE INFORMATION OVER THE INTERNET

BACKGROUND OF THE INVENTION

1. Field of the Invention

The present invention relates to accessing account information and, more particularly, to accessing account information over a network.

2. Description of the Related Art

Many business entities typically work with a number of vendors or suppliers to produce their products and/or services. Larger business entities (e.g., midsize and large corporations) typically include an accounts receivable department and an accounts payable department. An accounts payable department is responsible for payment of the invoices received by vendors or suppliers. An accounts receivable department is responsible for sending out invoices to various business entities and monitoring payment of the invoices. The accounts payable department of a business entity interacts with accounts receivable departments of its vendors or suppliers.

Conventionally, personnel of the accounts receivable departments of the vendors or suppliers daily or weekly telephone personnel of the accounts payable department of the business entity to ask for information such as invoice payments and, when invoices have been paid, the check number and amount of the check. Typically, clerks at the accounts payable department of the business entity would have to service the telephone or facsimile inquiries. The clerks would then look up the information requested either on a computer system or in manual files of the business entity. Thereafter, the clerk would return the telephone calls or facsimiles to respond to the inquiries.

One problem with the conventional interaction between accounting departments of business entities is that the substantial amount of man power required to service these account inquiries from suppliers or vendors is burdensome for the business entities. The account inquiries are particularly disruptive to the accounts payable departments of business entities.

Also, telephonic methods of accessing account information have been conventionally utilized. For example, a vendor or supplier could telephone a business entity to access certain limited account information by entering a password code and various other codes on the telephone keypad. However, telephonic methods are also problematic because not only does it take a long amount of time to request and receive the information, but only a limited amount of account information can be accessed in this manner.

Thus, there is a need for improved ways for suppliers or vendors to access account information of a business entity.

SUMMARY OF THE INVENTION

Broadly speaking, the invention relates to improved techniques for remotely accessing account information through the Internet. The invention provides security measures so that unauthorized access is unlikely even though the Internet is utilized. Assuming access is authorized, the invention acquires the requested account information and then presents the requested account information to a requester via the Internet in a format suitable for the type of requested account information. In addition, as an additional security measure, the invention may also filter out any account holder identifying information from the requested account information such that the account information presented to the requester does not identify the account holder.

In one embodiment, the account information being remotely accessed via the Internet is the actual (i.e., "live") account information of a business entity. As an example, the account information can be accounts payable information of the business entity which is stored on and accessed directly from a financial database ordinarily used by the business entity. Normally, the financial database is stored on a secure financial computer protected from external network access by a firewall.

The invention can be implemented in numerous ways, including as a method, a system, or a computer readable medium. Several embodiments of the invention are discussed below.

As a method for accessing account information from a business entity financial computer over the Internet, an embodiment of the invention includes: requesting, a client machine, access to a server machine, the client machine and the server machine being coupled to the Internet, and the server machine having a secure connection to the business entity financial computer; determining whether access is authorized; requesting, at the client machine, account information from the business entity financial computer; extracting, at the server machine, the requested account information from the business entity financial computer over the secure connection; and forwarding at least a portion of the extracted data from the server machine to the client machine.

As a method for accessing account information from a business entity financial computer over the Internet, another embodiment of the invention includes: requesting, a client machine, access to an Internet server machine, the client machine and the Internet server machine being coupled to the Internet, and the Internet server machine having a secure connection to the business entity financial computer; determining whether access is authorized; displaying, at the client machine, an information selection screen offering a plurality of different report types of account information when access is determined to be authorized; selecting one of the different report types of account information; displaying a data entry screen for the selected report type; entering data for the selected report type using the data entry screen being displayed; transmitting, to the server machine, a request for the selected report type in accordance with the data entered; extracting, at the server machine, the requested account information from the business entity financial computer over the secure connection; producing a report of the selected report type from at least a portion of the extracted account information; forwarding the report produced from the server machine to the client machine; and displaying, at the client machine, the report forwarded from the server machine.

As a system for remotely viewing accounts payable information, an embodiment of the invention comprises: an account information computer that stores the accounts payable information for a business entity, the accounts payable information is the actual, up-to-date accounts payable information for the business entity; a local network server machine coupled to the account information computer over a secure communications link and coupled to the Internet; and a remote client machine coupled to the Internet. A vendor representative for a vendor can operate the remote client machine to gain access to accounts payable information for the vendor that is stored in the account information computer. The vendor enters a request at the remote client machine, and then the request is forwarded to the local network server through the Internet. The local network server interprets the request and accesses the accounts payable information computer via the secure communications link to obtain certain accounts payable information for the vendor. Thereafter, the certain accounts payable information is then forwarded to the remote client machine through the Internet.

As a computer readable medium containing program instructions for accessing account information from a business entity financial computer over the Internet, an embodiment of the invention includes: first computer readable code for requesting, a client machine, access to a server machine, the client machine and the server machine being coupled to the Internet, and the server machine having a secure connection to the business entity financial computer; second computer readable code for determining whether access is authorized; third computer readable code for requesting, at the client machine, account information from the business entity financial computer; fourth computer readable code for extracting, at the server machine, the requested account information from the business entity financial computer over the secure connection; and fifth computer readable code for forwarding at least a portion of the extracted data from the server machine to the client machine.

The advantages of the invention are numerous. One advantage of the invention is that the man power required to service incoming inquiries from vendors or suppliers regarding payment of their invoices is substantially reduced. Another advantage of the invention is that vendors or suppliers are able to access account information of the business entity to determine the payment status of their invoices. Still another advantage of the invention is that the account information from the business entity concerning vendors or suppliers can be downloaded and imported into a spreadsheet. Yet another advantage of the invention is that a vendor can be electronically notified of the payment of an invoice prior to funding their account with said payment. This advance notification allows vendors or suppliers to pre-post their receivables and thus provide a cash forecast.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 10A–10D are screen shots of various request screens and their associated reports produced at the Internet browser application on the client machine.

DETAILED DESCRIPTION OF THE INVENTION

The invention relates to improved techniques for remotely accessing account information through the Internet. The invention provides security measures so that unauthorized access is unlikely even though the Internet is utilized. Assuming access is authorized, the invention acquires the requested account information and then presents the requested account information to a requester via the Internet in a format suitable for the type of requested account information. In addition, as an additional security measure, the invention may also filter out any account holder identifying information from the requested account information such that the account information presented to the requester does not identify the account holder.

The invention is particularly advantageous when the account information being remotely accessed via the Internet is the actual (i.e., "live") account information of a business entity. As an example, the account information can be accounts payable information of the business entity which is stored on and accessed directly from a financial database ordinarily used by the business entity. Ordinarily, the financial database is stored on a secure financial computer protected from external network access by a firewall.

Embodiments of the invention are discussed below with reference to FIGS. 1A–10D. However, those skilled in the art will readily appreciate that the detailed description given herein with respect to these figures is for explanatory purposes as the invention extends beyond these limited embodiments.

Figure 1A:
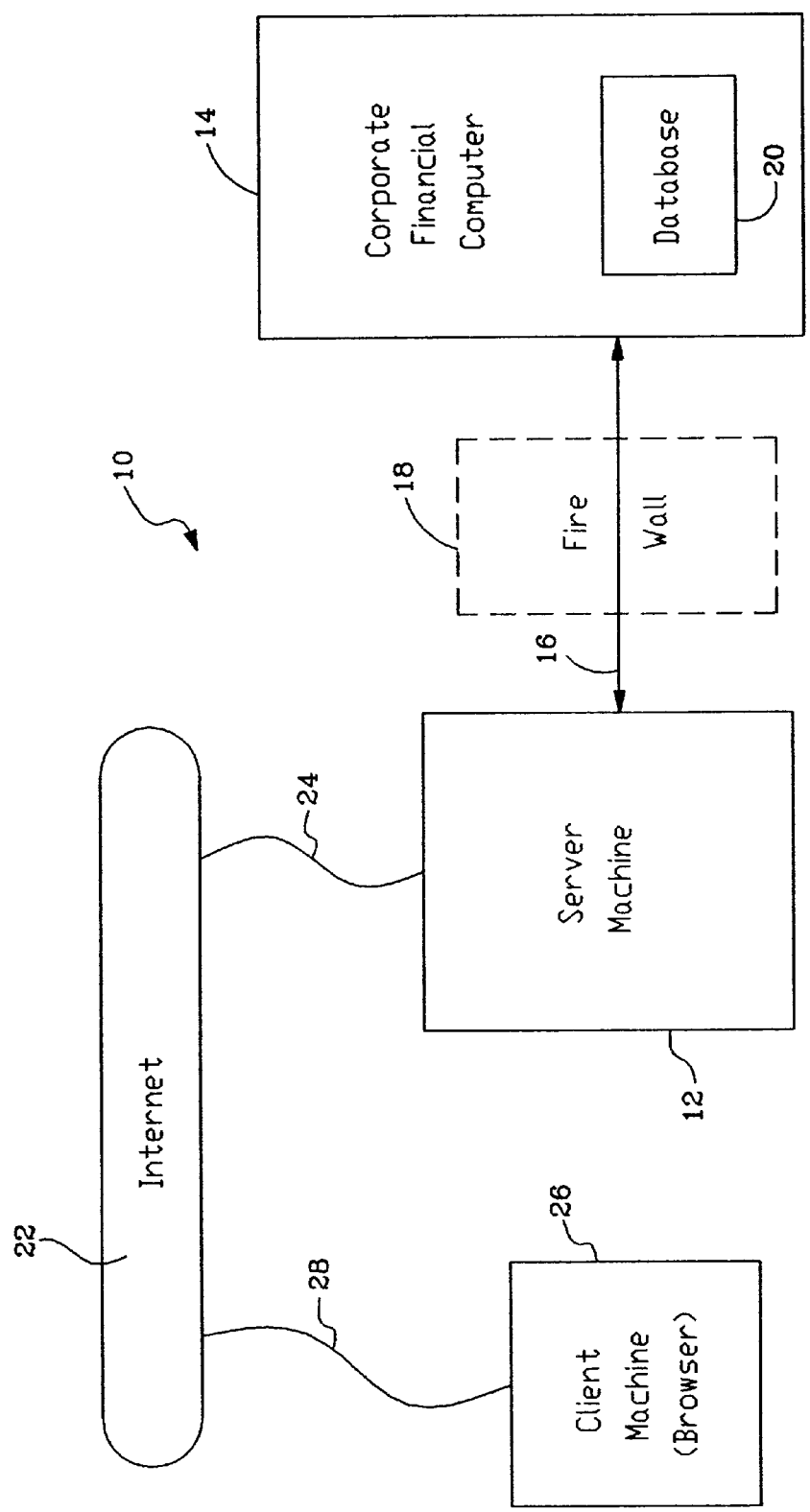
FIG. 1A is a block diagram of an account information access system according to an embodiment of the invention.

FIG. 1A is a block diagram of an account information access system 10 according to an embodiment of the invention. The account information access system 10 provides for remote access to account information via the Internet. More particularly, the account information access system 10 includes a server machine that is coupled to a corporate financial computer 14 over a secure communication channel 16. The communication channel 16 is secure because it passes through a firewall 18 located between the server machine 12 and the corporate financial computer 14. The corporate financial computer 14 includes a database 20 that holds the account information that is accessible by the server machine 12 over the communication link 16. The server machine 12 is coupled to the Internet 22 through a link 24. Typically, the link 24 is a high speed data link. Hence, since the server machine 12 is connected to the publicly accessible Internet 22, users or requesters on client machines (e.g., the client machine 26) coupled to the Internet are able to access the server machine 12 and instruct the server machine 12 to access the database 20 on the corporate financial computer 14, and return the results to the requesting client machine. For example, the client machine 26 can operate an Internet browser application and communicate with the server machine 12 that hosts a website using Hyper Text Transfer Protocols (HTTP) and Hyper Text Markup Language (HTML) pages.

Although the account information access system 10 provides for remote access to account information via the Internet, the access has various security measures. For example, access is permitted only if the account is activated for remote access and the requester successfully logs in with a password. Also, the account information that the requester is able to view is only that account information that pertains to the requester. Still further, no account holder information is accessible by the requesters, only the account data itself (typically numbers and alpha-numeric identifiers). The information that a requester requests to view is presented to the user as a report. In one embodiment, the report is an HIML file that is formed by the server machine 12 and transmitted to the client machine 26 where it is displayed via the Internet browser application. The security measures processing and the report generation processing are described in detail below with respect to FIGS. 1B through 8B.

Figure 1B:
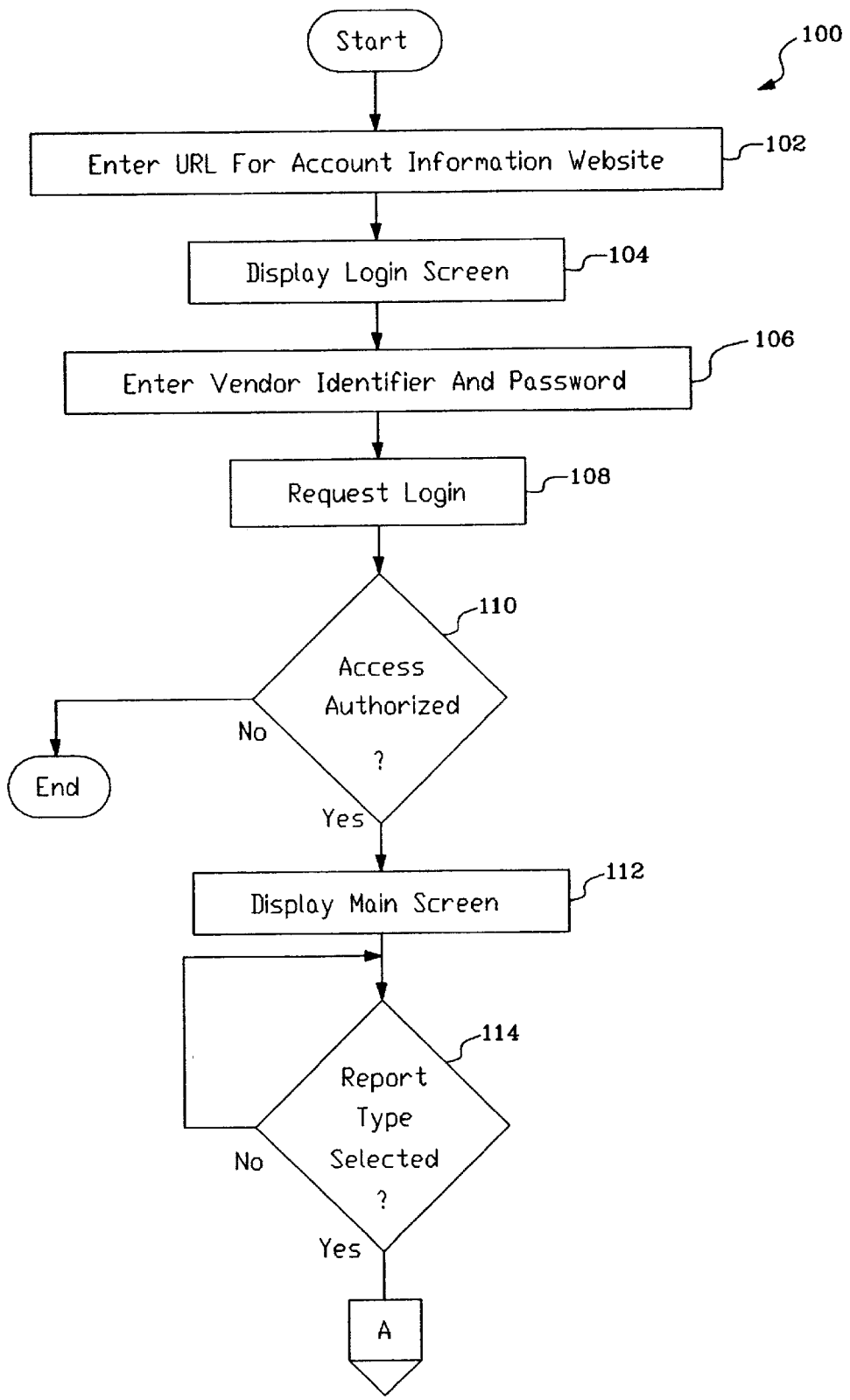
FIGS. 1B and 1C are flow diagrams of information access processing according to an embodiment of the invention.
Figure 1C:
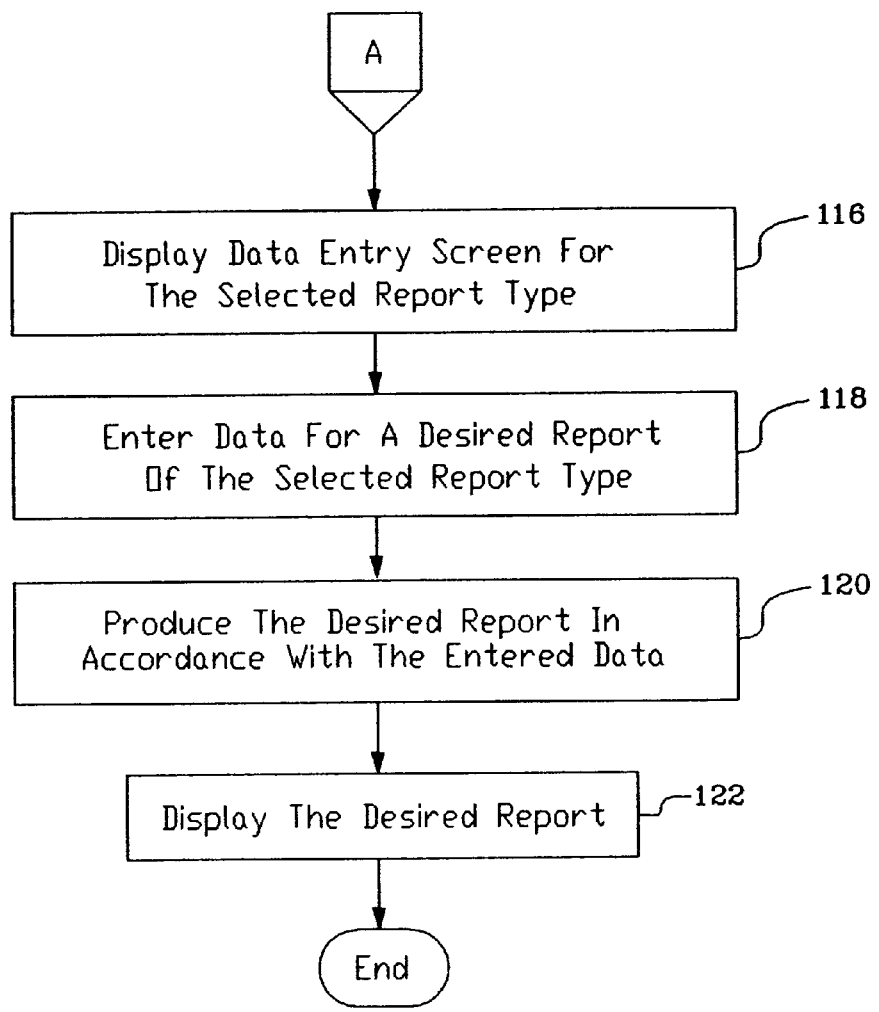

FIGS. 1B and 1C are flow diagrams of information access processing 100 according to an embodiment of the invention. The information access processing 100 is instructed by a user of a client machine (computer), and processed by the client machine and a server machine (computer). The results of the information access processing 100 are then displayed to the user at the client machine. The processing by the server machine includes accessing an account information database maintained on an account information machine (computer) such as a corporate financial computer containing financial or account information for a business (e.g., corporation). The interconnection of the client machine, the server machine and the account information machine are discussed below with respect to FIG. 9.

Initially, a universal resource locator (URL) is entered 102 to specify an account information website. Typically, the URL would be entered 102 into an address line of an Internet browser application (e.g., Netscape Navigator). Upon entry of the URL, the Internet browser application operates to go to that location (address), retrieve a page (e.g., HTML page) associated with that address from the server machine, and then transmit the page to the Internet browser application running on the client machine.

After the Internet browser application receives the page from the server machine, a login screen is displayed 104 at the client machine because the received page is the login screen. The login screen serves to allow users to attempt to gain access to certain account information residing on the account information machine. To gain access, the user enters 106 a vendor identifier and a password. Thereafter, the user requests 108 login. The login request is then transmitted by the Internet browser application to the server machine.

Upon receiving the login request, the server machine determines whether or not the login request will be authorized or denied. A decision block 110 then determines whether access to the account information machine is authorized. When the access is not authorized, the information access processing 100 is complete and ends. Here, access is denied if either the vendor identifier entered is not an authorized identifier or, when the vendor identifier is authorized, the password entered does not match a stored password. On the other hand, when access is determined to be authorized, a main screen (e.g., HTML page) is transmitted from the server machine to the client machine. The main screen is then displayed 112 on the client machine.

From the main screen, the user is able to select one of a plurality of different report types. Each of the report types provide to the user account information. The account information is extracted from the account information database in the account information machine. Hence, at this point in the information access processing 100, a decision block 114 determines whether a particular report type has been selected by the user. The user is able to select a particular report type by, for example, a "point-and click" action with respect to the main screen being displayed on the client machine. As long as no particular report type has been selected, the information access processing 100 waits until a particular report type is selected. However, once a particular report type has been selected, the information access processing 100 continues.

When the information access processing 100 continues following the selection of a particular report type, a data entry screen is displayed 116 for the selected report type. Next, data for a desired report of the selected report type is entered 118. Typically, the data entered 118 will vary with the type of report being requested. The data entered 118 is then transmitted by the Internet browser application over the Internet to the server machine hosting the account information website.

At the server machine, the desired report is produced 120 in accordance with the entered data. In producing the desired report, the server machine interacts and extracts account information from the account information database on the account information machine. After the desired report is produced, the server machine transmits the desired report to the user over the Internet to the Internet browser application on the server machine.

After the Internet browser application receives the desired report from the server machine, the desired report is displayed 122. Typically, the desired report is a HTML page that is displayed by the Internet browser application. At this point, the user has received the report containing account information that was requested. By way of the Internet browser application, the user is then able to view, print, save or download the report or its data. Following block 122, the information access processing 100 is complete and ends.

Figure 2:
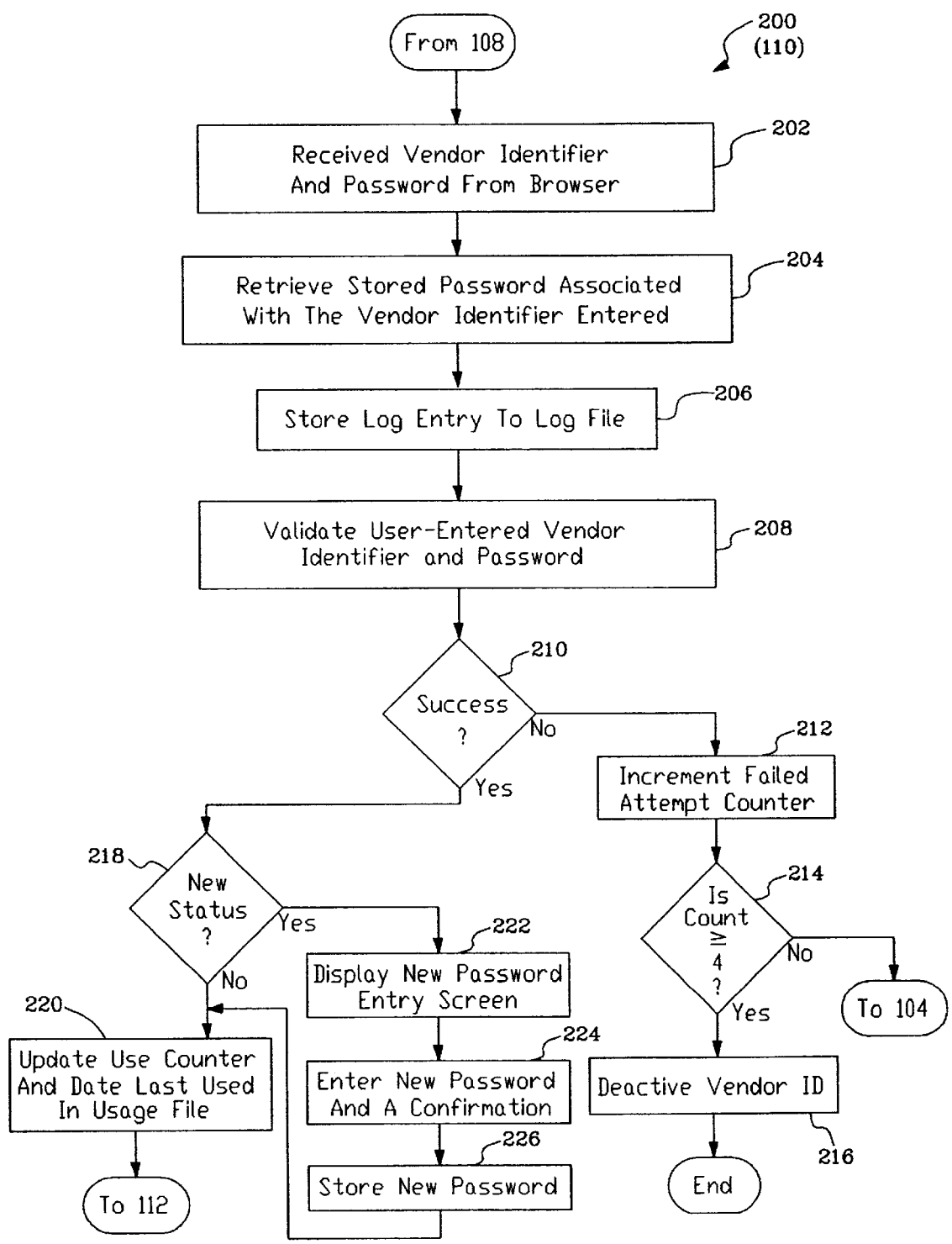
FIG. 2 is a flow diagram of access verification processing according to an embodiment of the invention.

FIG. 2 is a flow diagram of access verification processing 200 according to an embodiment of the invention. The access verification processing 200 is performed by the server machine and represents processing carried out by the information access processing 100 during determination of whether access is authorized 110.

The access verification processing 200 initially receives 202 a vendor identifier (user-entered vendor identifier) and a password from the Internet browser application on the client machine. Next, a stored password that is associated with the vendor identifier is retrieved 204. Preferably, the stored password is stored on a storage device associated with the server machine. A log entry is also stored 206 to a log file. In one embodiment, the log file resides on the server machine and includes log entries that include various information that may be used for diagnostic or security evaluations. As examples, the information stored in a log entry can include: date-time stamp, vendor identifier, report identifier, Common Gateway Interface (CGI) remote host address, TCP/IP address, and the like.

Next, the user-entered vendor identifier and password are then validated 208. The validation process for the user-entered vendor identifier and password can be provided by comparing the user-entered vendor identifier against a set of active vendor identifiers to first determine whether the vendor identifier is recognized and thus permitted access. Then, if the user-entered vendor identifier is recognized, the validation process determines whether the stored password associated with the vendor identifier matches the password that the user has entered.

A decision block 210 then determines whether the user-entered vendor identifier and password have been successfully validated. When the validation process is unsuccessful, a counter is incremented 212 to indicate a failed attempt to obtain access. Then, a decision block 214 determines whether the count is greater than or equal to four (4). If the count of failed attempts is determined by the decision block 214 to not equal or exceed four (4), then the user is permitted to continue to try to access the account information by returning to repeat block 104 and subsequent blocks of the information access processing 100. On the other hand, when the count of failed attempts is determined by the decision block 214 to equal or exceed four (4), then the vendor identifier that the user has entered is deactivated 216. By deactivating the vendor identifier after a predetermined number of failed attempts, system security is maintained because an unauthorized user will most likely not be able to guess the password for a particular vendor in three (3) attempts. Following block 216, the access verification processing 200 is complete and ends for lack of authorization, and likewise ends the information access processing 100 with a denial of access.

On the other hand, when the decision block 210 determines that the user-entered vendor identifier and password have been validated successfully, a decision block 218 determines whether the vendor identifier has a new status indication associated therewith. In one embodiment, the new status is associated with a vendor (vendor identifier) when the activation of the remote access capability for the vendor has recently been set up and not before now utilized. When the decision block 218 determines that the account does not currently have the new status associated therewith, then a use counter and date last used are updated 220. In one embodiment, a use counter is recorded in a usage file for each of the vendors and a date-time stamp is recorded in a usage file with each access. From the counters, a system administrator is able to easily determine the number of times a particular vendor has utilized the remote access capabilities of the system. The date-time stamp can serve to indicate when particular vendors utilized the remote access capabilities of the system. Following block 220, the access verification processing 200 is complete and processing then returns to block 112 of the information access processing 100.

Figure 3:
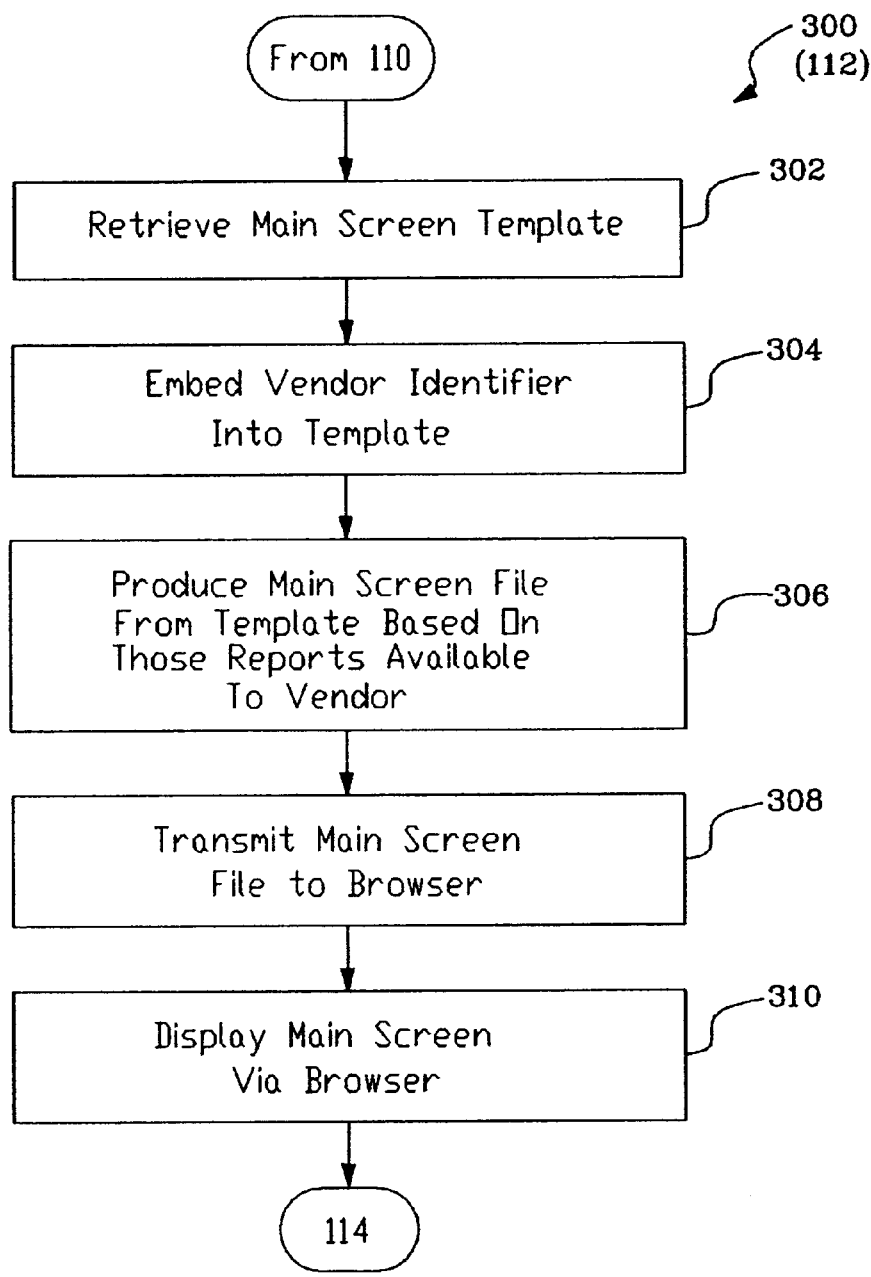
FIG. 3 is a block diagram of display processing for a main screen according to an embodiment of the invention.

FIG. 3 is a block diagram of display processing 300 for a main screen according to an embodiment of the invention. The display processing 300 corresponds to the processing carried out by the block 112 of the information access processing 100. Generally, the display processing 300 operates to display a main screen on the client machine, specifically on a display screen of the client machine.

The display processing 300 initially retrieves 302 a main screen template. Here, the server machine operates to retrieve 302 the main screen template from a storage area of the server machine. The advantage of using a template for the main screen is that the main screen is effectively pre-designed and constructed as a HTML page but is then further customized and finalized by subsequent processing. In this example, the main screen file is further customized and finalized by embedding various information into the main screen file as well as by determining which portions of the template to include or not include in the main screen file in accordance with predetermined configuration information for the account. The customizing and finalizing is performed by dynamic HTML using, for example, JavaScript.

After retrieving the main screen template, the server machine operates to embed 304 the vendor identifier into the main screen template. Preferably, the vendor identifier is embedded 304 into the template as a hidden value. A hidden value is a value that is part of the file, but is not displayed or accessible to a user that views and interacts with the displayed file.

Next, a main screen file is produced 306 from the template based on those reports available to the vendor. Namely, in one example, the main screen template is assumed to include a full set of reports that may possibly be made available to the vendor. Then the customization and finalization produces the main screen file from the main screen template so that only those reports available to a particular vendor are contained in the main screen file (as identified by predetermined configuration information).

The main screen file is transmitted 308 to the Internet browser application on the client machine. Thereafter, the main screen is displayed 310 by the Internet browser application running on the client machine. Following block 310, the display processing 300 for the main screen is complete and processing then returns to block 114 of the information access processing 100.

Figure 4A:
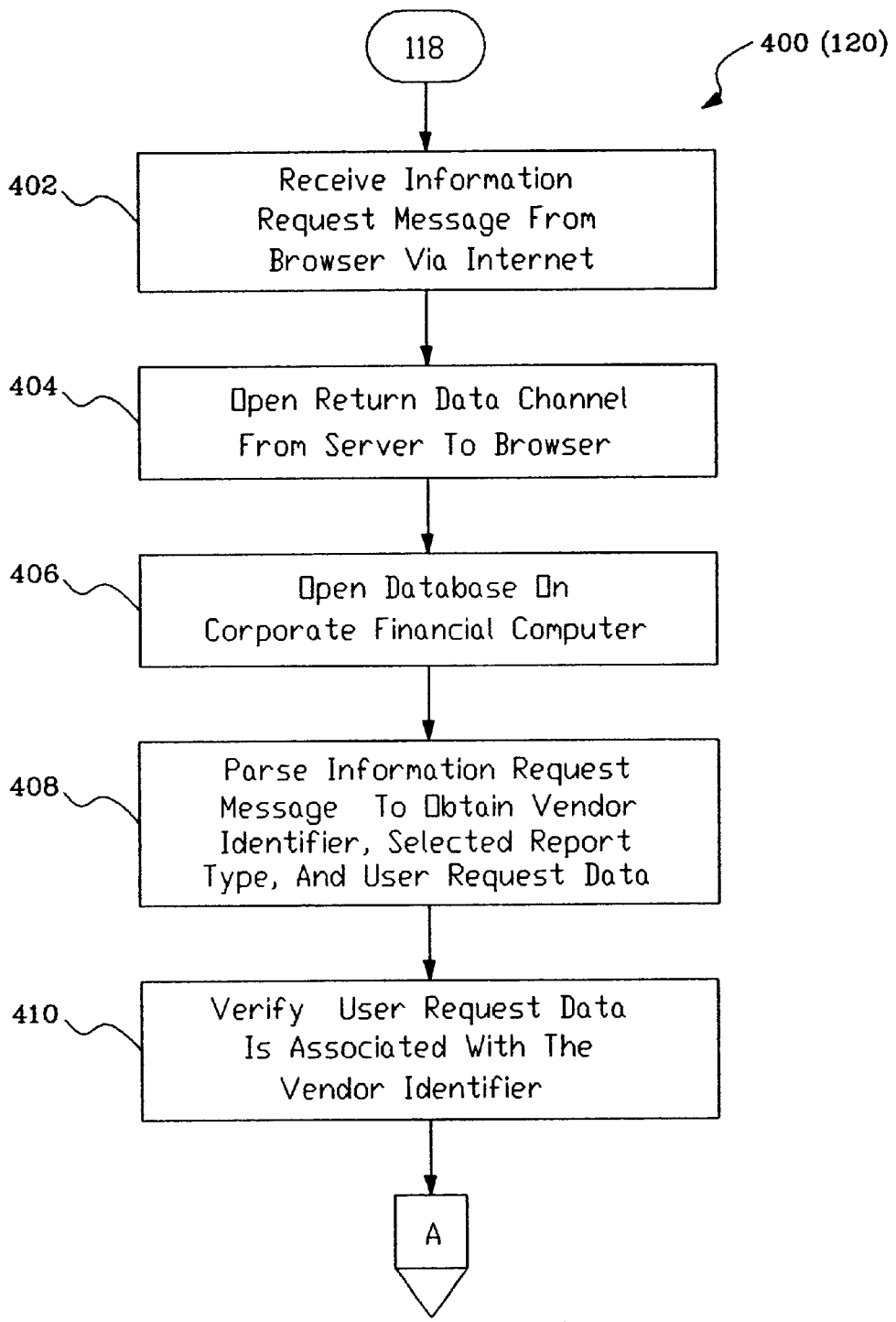
FIGS. 4A and 4B are flow diagrams of report generation processing according to embodiment of the invention.
Figure 4B:
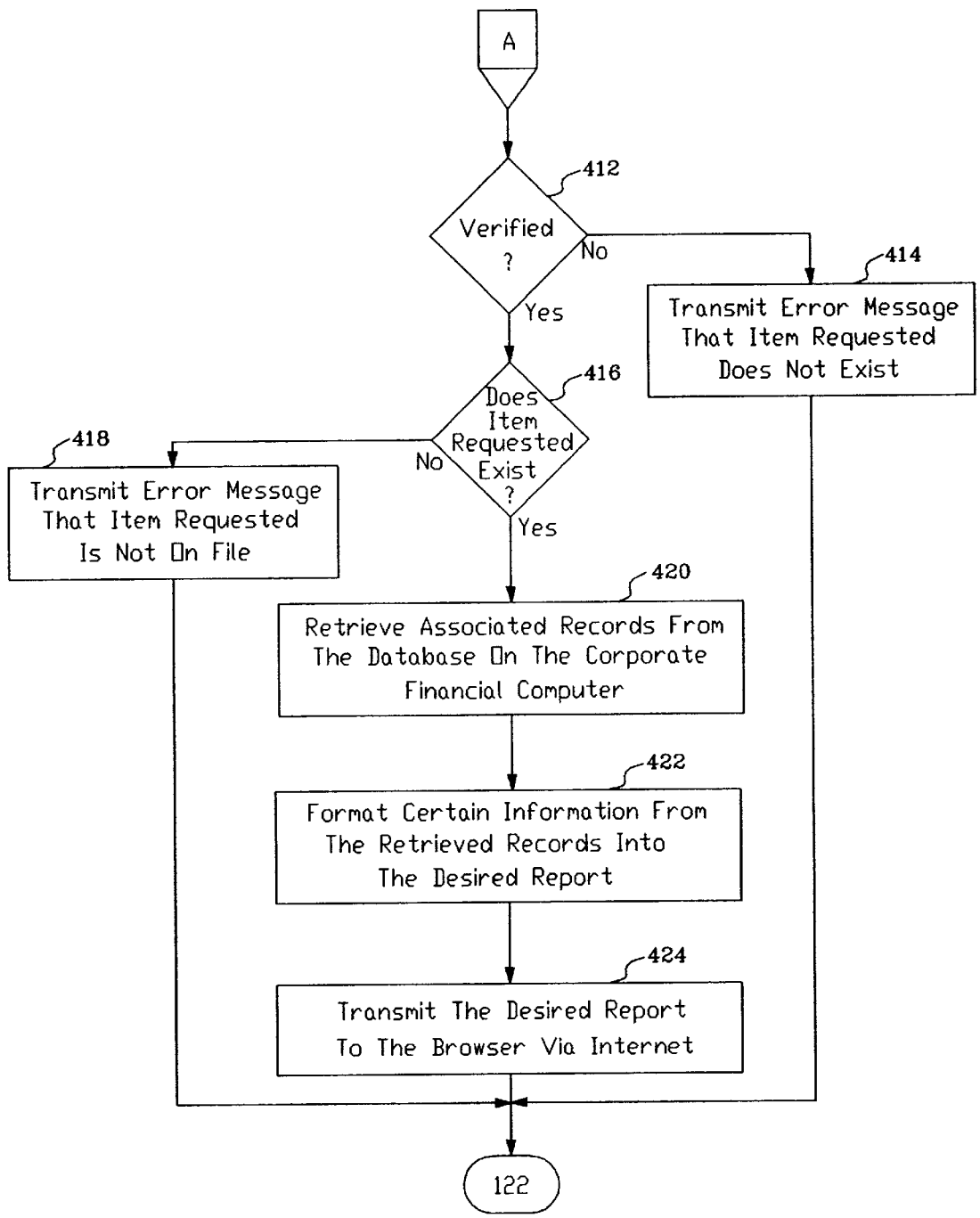

FIGS. 4A and 4B are flow diagrams of report generation processing 400 according to an embodiment of the invention. The report generation processing 400 corresponds to processing carried out by the block 120 of the information access processing 100 illustrated in FIG. 1C. In particular, the report generation processing 400 produce a desired report. Preferably, the report generation processing 400 is performed at the server machine.

The report generation processing 400 initially receives 402 an information request message from the Internet browser application via the Internet. The information request message, for example, includes user request data (e.g., check number, voucher number, etc.), a selected report type and a vendor identifier. After receiving the information request message, a return data channel is opened 404 from the server machine to the Internet browser application on the client machine. Additionally, the Internet browser application may be instructed to clear its screen and perhaps indicate that the request is being processed. The advantage of opening the return data channel soon after receiving the information request message is that the user is notified that the request has been issued and that the server machine is working to satisfy the request.

Next, a database located on a corporate financial computer is opened 406. The database on the corporate financial computer is the database that holds all the account information for the corporation. The account information for the corporation is, for example, the accounting information such as vendor information, check payments, vouchers, invoices and the like that are utilized in a financial department of a business. Hence, it is preferable that the database be the same database where the financial information is normally kept by the corporation. Accordingly, the database being opened 406 is preferably not a new database or a specialized database that provides a subset of information that is accessible via the Internet, but is instead the actual database that would normally be accessed by those internal to the corporation. It should also be noted that corporate or corporation refers to a business generally and is not limited to businesses that are legally formed as corporations.

The information request message is then parsed 408 to obtain the vendor identifier, the selected report type, and the user request data. In one embodiment, the information request message is transmitted to the server machine by a POST command of HTTP protocol. Here, the information request message is parsed 408 to obtain the specific data items.

Next, the user request data is verified 410 to ensure that it is associated with the vendor identifier. Here, the report generation processing 400 checks whether the user request data (e.g., account information) that the user is requesting pertains to the vendor having the vendor identifier whose access has been authorized. This additional verification 410 prevents one vendor from viewing another vendor's account information. A decision block 412 then determines whether or not the verification check was successful.

If the verification check fails, an error message indicating that the data item requested does not exist is transmitted 414 to the Internet browser application on the client machine. Following block 414, the report generation processing 400 is complete and processing returns to block 122 of the information access processing 100.

On the other hand, when the verification check is successful, then a decision block 416 determines whether the user request data (i.e., item requested) exists. If the item requested does not exist, an error message that the item requested is not on file is transmitted 418 to the Internet browser application on the client machine. Following block 418, the report generation processing 400 is complete and processing returns to block 122 of the information access processing 100.

Alternatively, when the decision block 416 determines that the item requested does exist, the report generation processing 400 continues. Specifically, the associated records from the database on the corporate financial computer are retrieved 420. Then, certain information from the retrieved records is formatted 422 into the desired report. The desired report can be any of a variety of report types. Examples of various desired reports and their formats are described below in detail. After the desired report is so formed, the desired report is transmitted 424 to the Internet browser application on the client machine via the Internet. Following block 424, the report generation processing 400 is complete and processing returns to block 122 of the information access processing 100.

In various embodiments of the invention, different report types may be utilized and produced. Examples of reports that are useful for obtaining access to financial information are: an invoice report, a voucher report, an open items report and a check report. With the generation of these different report types, the processing involved in producing a particular report is different depending on the report type being generated. However, in each case, the processing performed generally follows the processing described in the report generation processing 400 illustrated in FIGS. 4A and 4B. Even so, more specific processing is described below for several different report types with reference to FIGS. 5A through 8B.

Figure 9A:
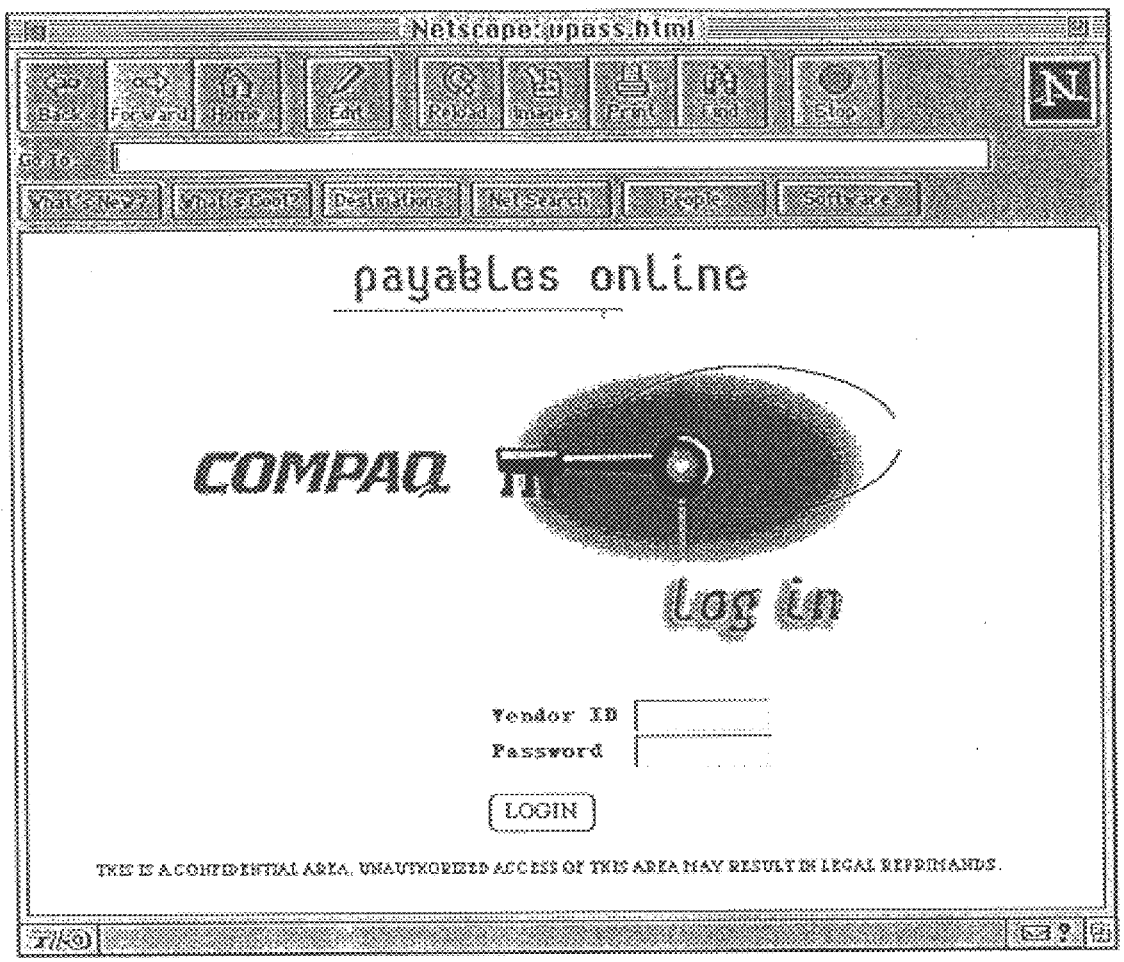
FIGS. 9A–9G are screen shots of a login display screen and various portions of a main screen suitable for use with the invention.
Figure 9B:
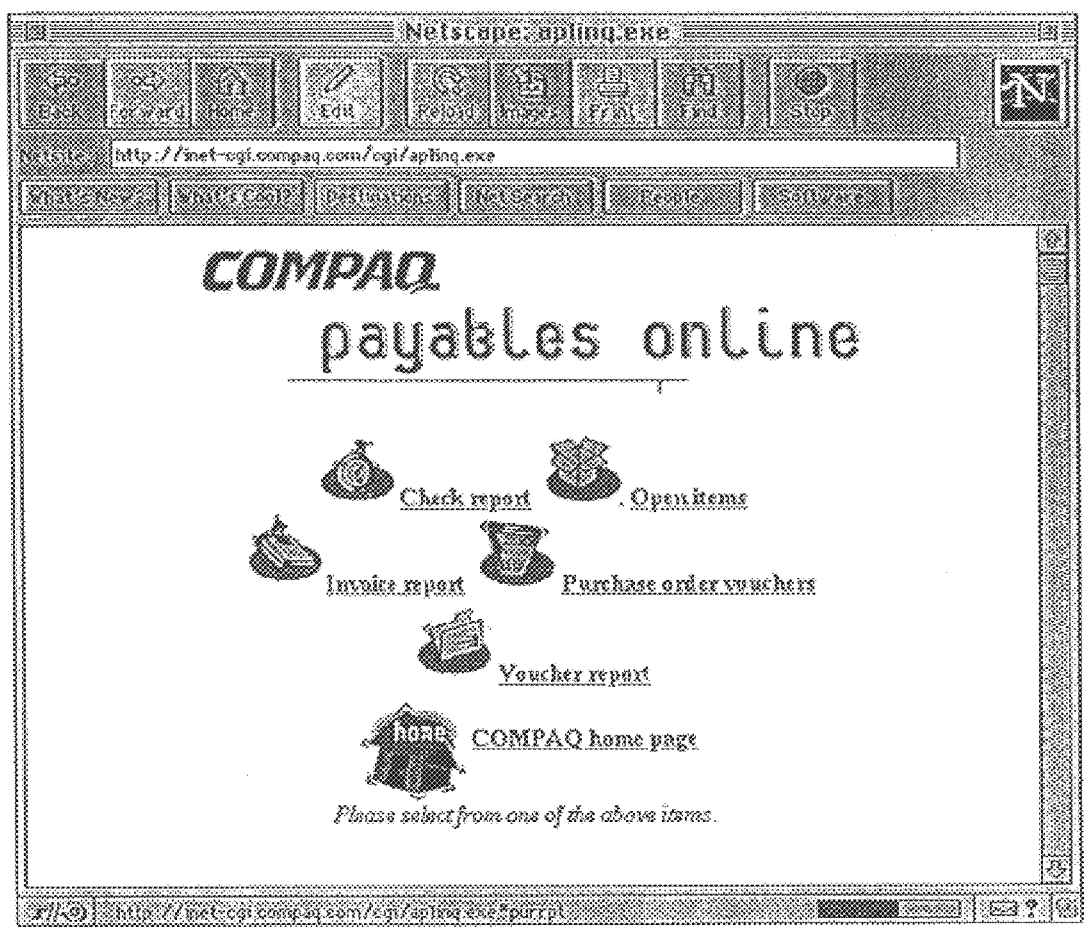

FIGS. 9A–9G are exemplary screen shots of a login display screen, a main screen and various data input screens for different report types suitable for use with the invention. Specifically, FIG. 9A represents an exemplary login screen such as displayed by the displaying 104 of the information access processing 100, and FIG. 9B represents an exemplary main screen such as displayed by the displaying 112 of the information access processing 100. Further, FIGS. 10A–10D are exemplary screen shots of various request screens and their associated reports produced at the Internet browser application on the client machine.

Figure 5A:
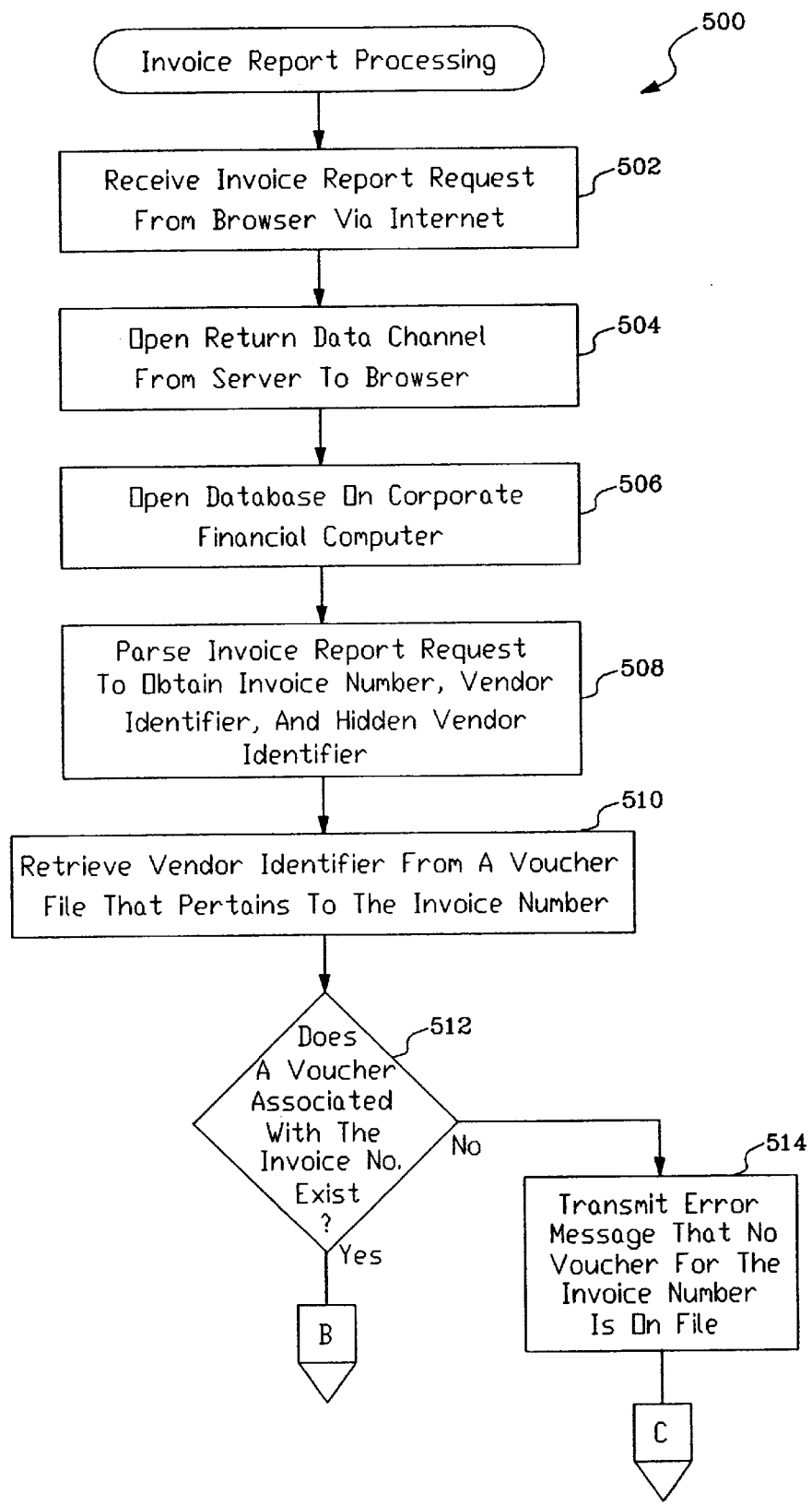
FIGS. 5A–5C are flow diagrams of invoice report processing according to an embodiment of the invention.
Figure 5B:
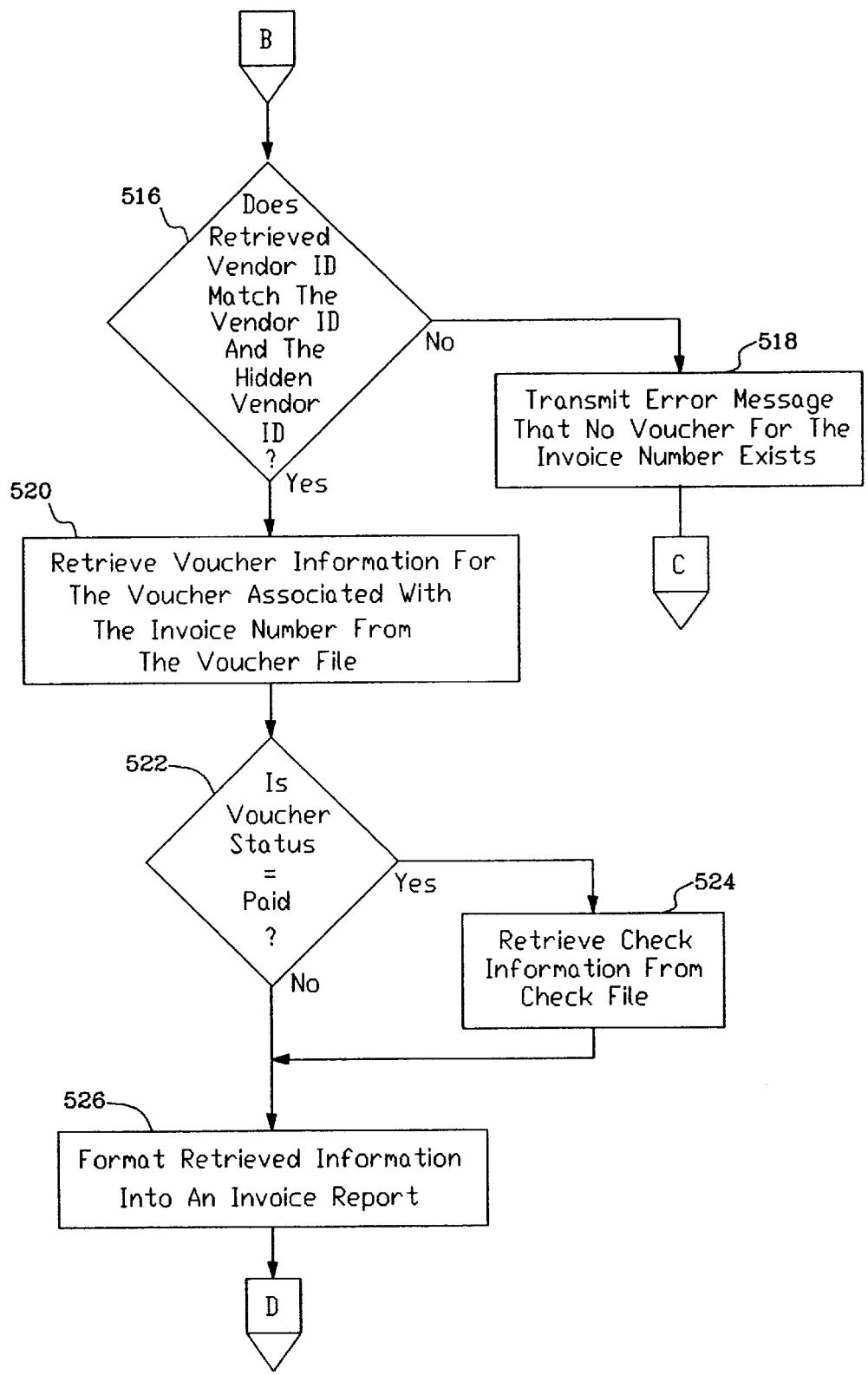
Figure 5C:
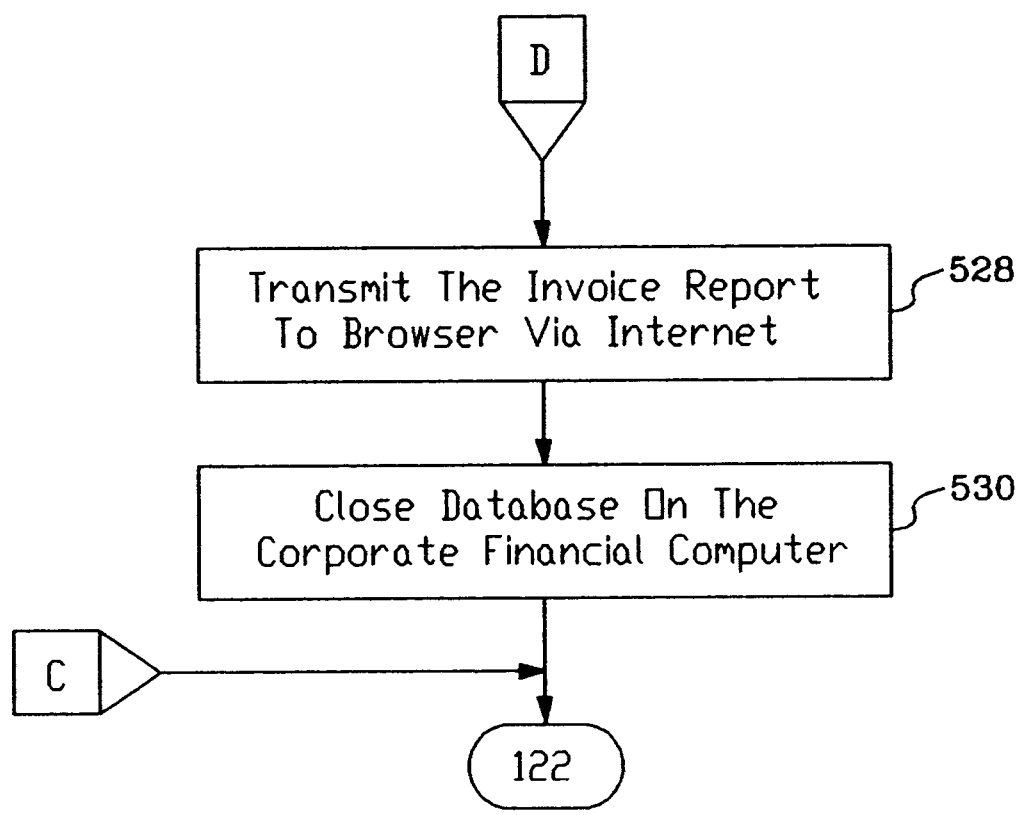

FIGS. 5A–5C are flow diagrams of invoice report processing 500 according to an embodiment of the invention. The invoice report processing 500 operates to produce an invoice report. In one embodiment, the invoice report processing 500 is performed by the server machine.

The invoice report processing 500 initially receives 502 an invoice report request from the Internet browser application via the Internet. Then, a return data channel is promptly opened 504 from the server machine to the Internet browser application on the client machine. A database on a corporate financial computer is also opened 506 so that access to the account information in the database will be available.

The invoice report request is then parsed 508 to obtain an invoice number, a vendor identifier, and a hidden vendor identifier. A vendor identifier (retrieved vendor identifier) that pertains to the invoice number obtained from the invoice report request is also retrieved 510 from a voucher file. The voucher file is a file within a database on a corporate financial computer and includes information on vouchers of the corporation.

A decision block 512 then determines whether a voucher associated with the invoice number exists. Here, the decision block 512 is determining whether there is a voucher for the invoice number that the user has requested information on. Typically, a corporation will issue a voucher for a particular invoice when the invoice has been received and initially processed by the corporation. When the decision block 512 determines that there is no voucher currently in the voucher file that is associated with the invoice number, then an error message is transmitted 514 to the Internet browser application on the client machine via the Internet. The error message in this case indicates that no voucher is on file for the invoice number. Following block 514, the invoice report processing 500 is complete and processing returns to block 122 of the information access processing 100.

On the other hand, when the decision block 512 determines that a voucher associated with the invoice number does currently exist in the voucher file, then a decision block 516 determines whether the vendor identifier retrieved from the voucher file matches both the vendor identifier and the hidden vendor identifier from the invoice report request. When the vendor identifiers do not match, then for security reasons access to the requested account information is denied and instead an error message is produced and transmitted 518 to the Internet browser application on the client machine. The error message in this case indicates that no voucher for the invoice number exists. Following block 518, the invoice report processing 500 is complete and processing returns to block 122 of the information access processing 100. In one embodiment, the requesters of the account information are vendors of the corporation. In such a case, the decision block 516 permits a vendor to remotely view their account information, but prevents the vendor from viewing the account information of other vendors.

Alternatively, when the decision block 516 determines that the various vendor identifiers properly match, then voucher information for the voucher associated with the invoice number is retrieved 520 from the voucher file. The voucher information, for example, may include: voucher number, voucher status, amount, and amount paid. The voucher information may also include: associated purchase order number, associated invoice number, and associated invoice date.

Next, a decision block 522 determines whether the status of the voucher is "PAID". For example, the voucher status is either "PAID", "OPEN" or "VOID". When the decision block 522 determines that the status of the voucher is "PAID", then check information is retrieved 524 from a check file of the database. In one embodiment, the check file holds information on all checks issued by the corporation. Specifically, when the voucher in question has been paid, the payment is normally made by a check. Hence, when the voucher status is "PAID", check information should be available and retrieved from the check file. Typically, the appropriate check information in the check file can be identified by a check number that is associated with the voucher and obtained from the voucher file.

Following block 524, or following the decision block 522 when the status of the voucher is not "PAID", the retrieved information is formatted 526 into an invoice report. Next, the invoice report is transmitted 528 to the Internet browser application on the client machine via the Internet. The database on the corporate financial computer is also closed 530. Thereafter, the invoice report processing 500 is complete and the processing returns to block 122 of the information access processing 100.

Figure 9C:
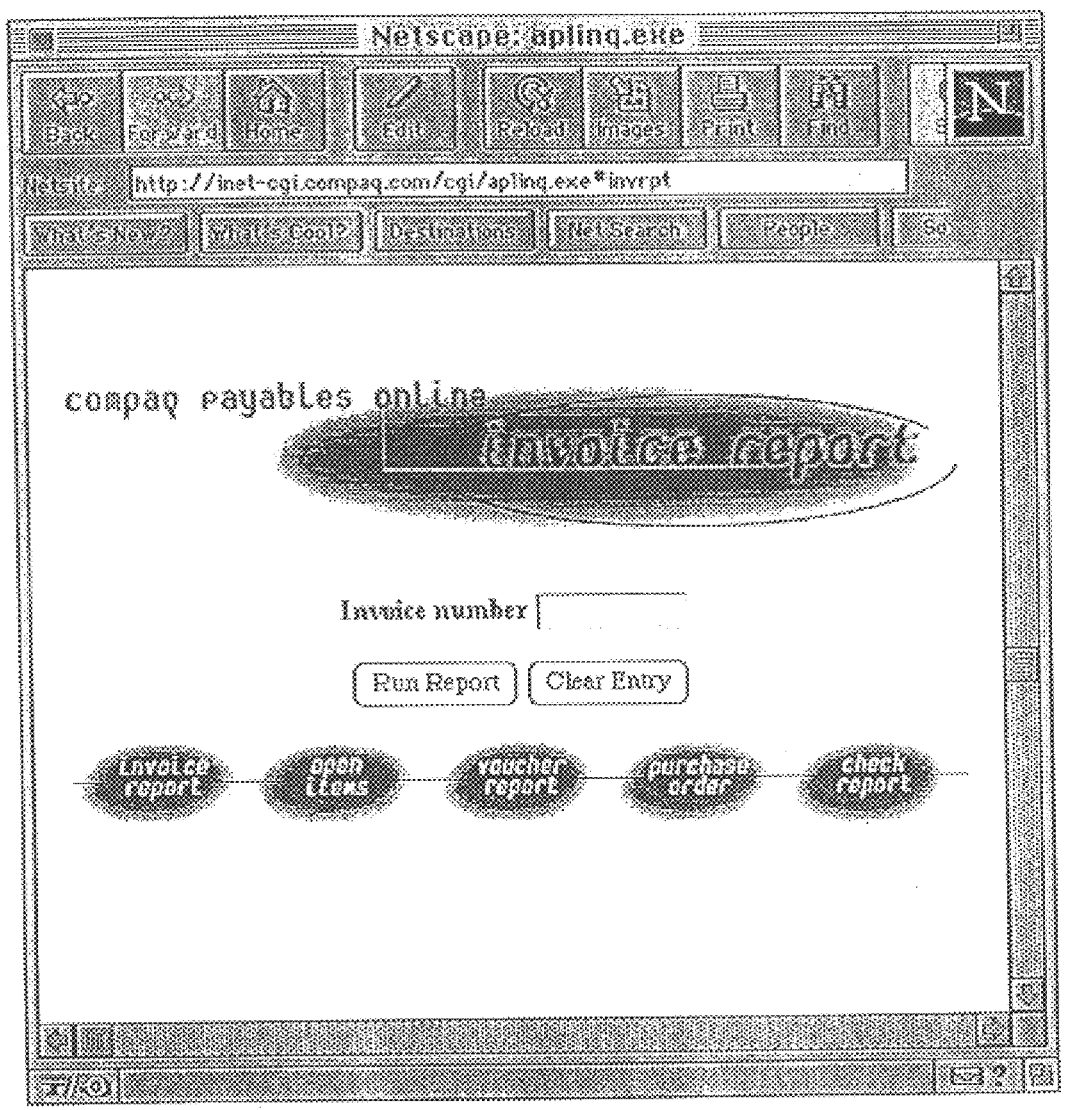
Figure 10A:
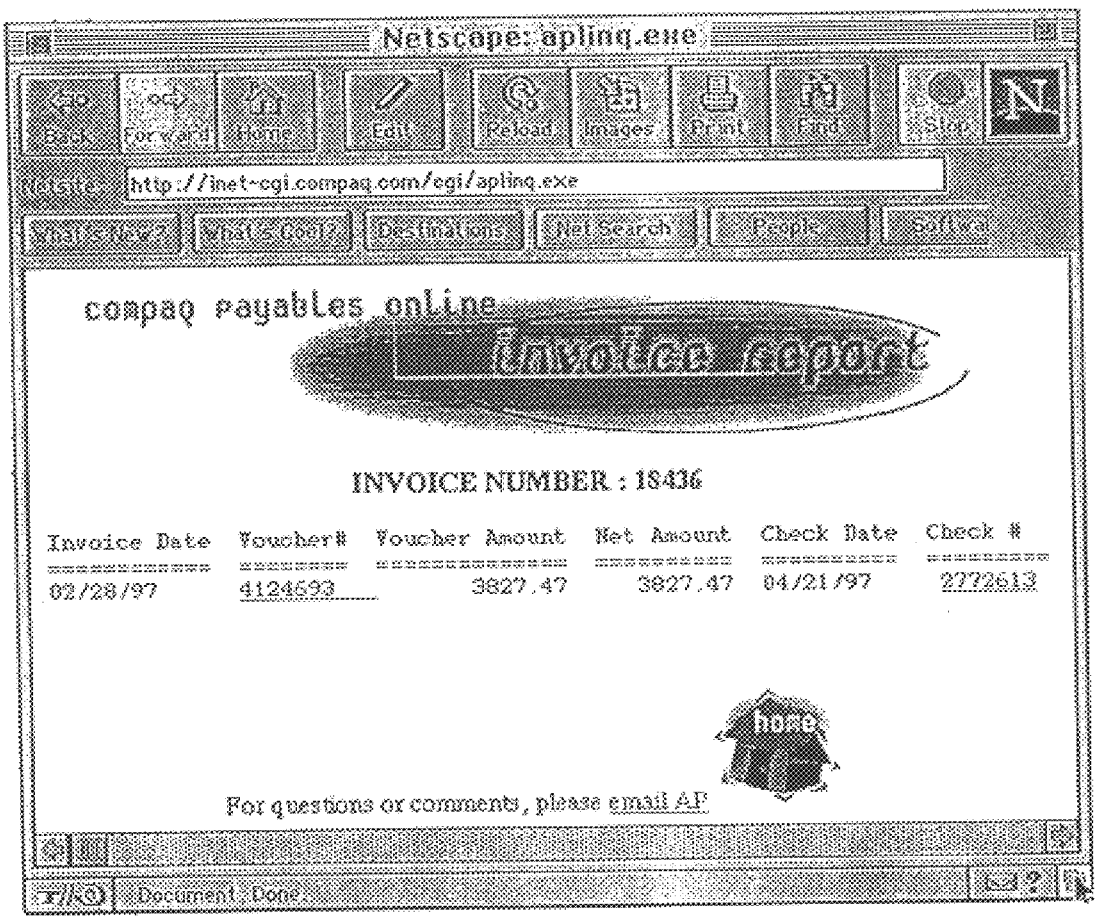

There are various ways to produce an invoice report such that the invoice information is presented to the requester in a logical and user friendly way. Normally, the invoice report will include various labels with amounts or identifiers associated with those labels. FIGS. 9C and 10A are exemplary screen depictions displayed by an Internet browser application on the client machine. More particularly, FIG. 9C is an exemplary data entry screen for an invoice report, and FIG. 10A is an exemplary invoice report.

Figure 6A:
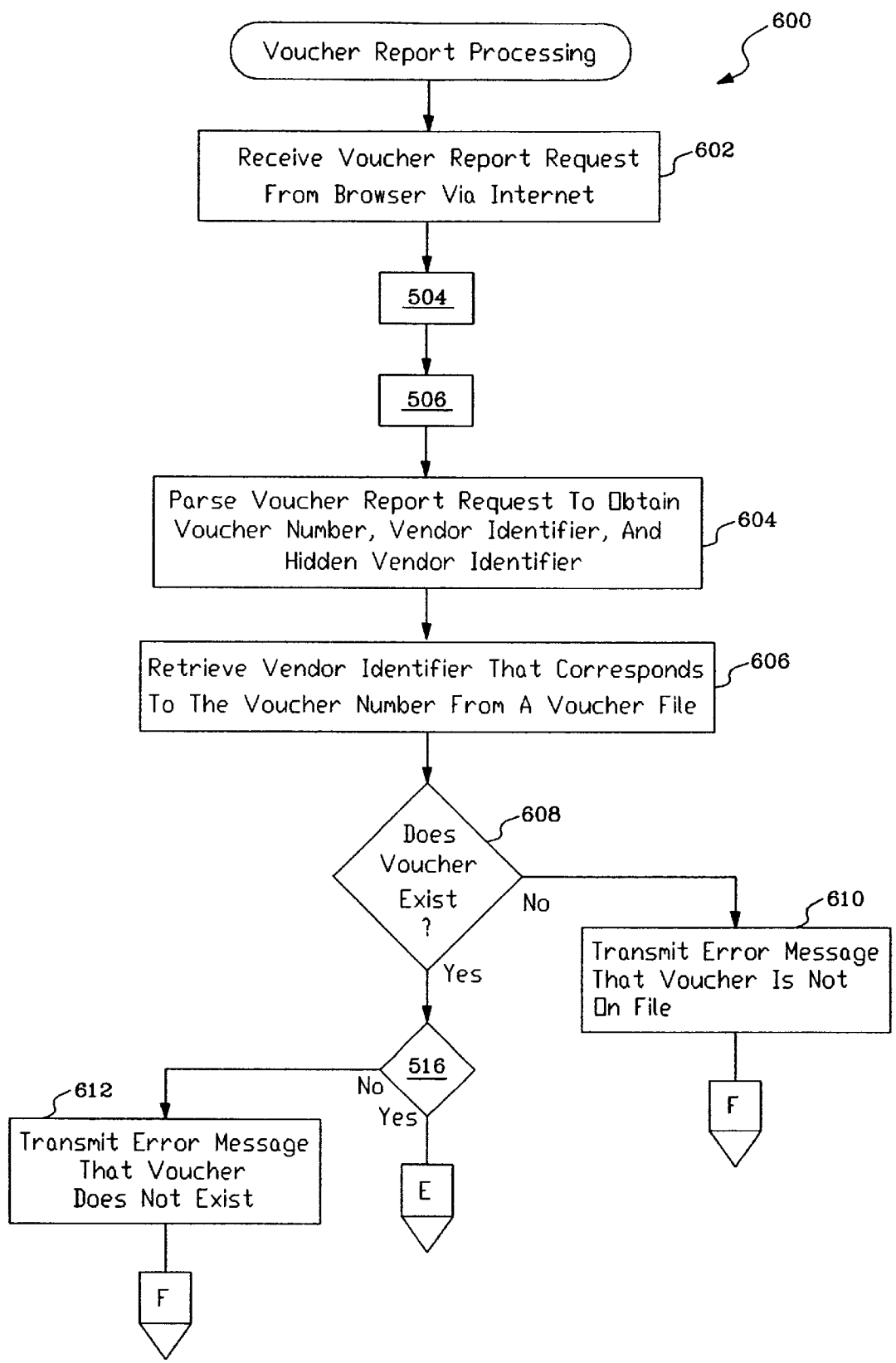
FIGS. 6A and 6B are flow diagrams of a voucher report processing according to an embodiment of the invention.
Figure 6B:
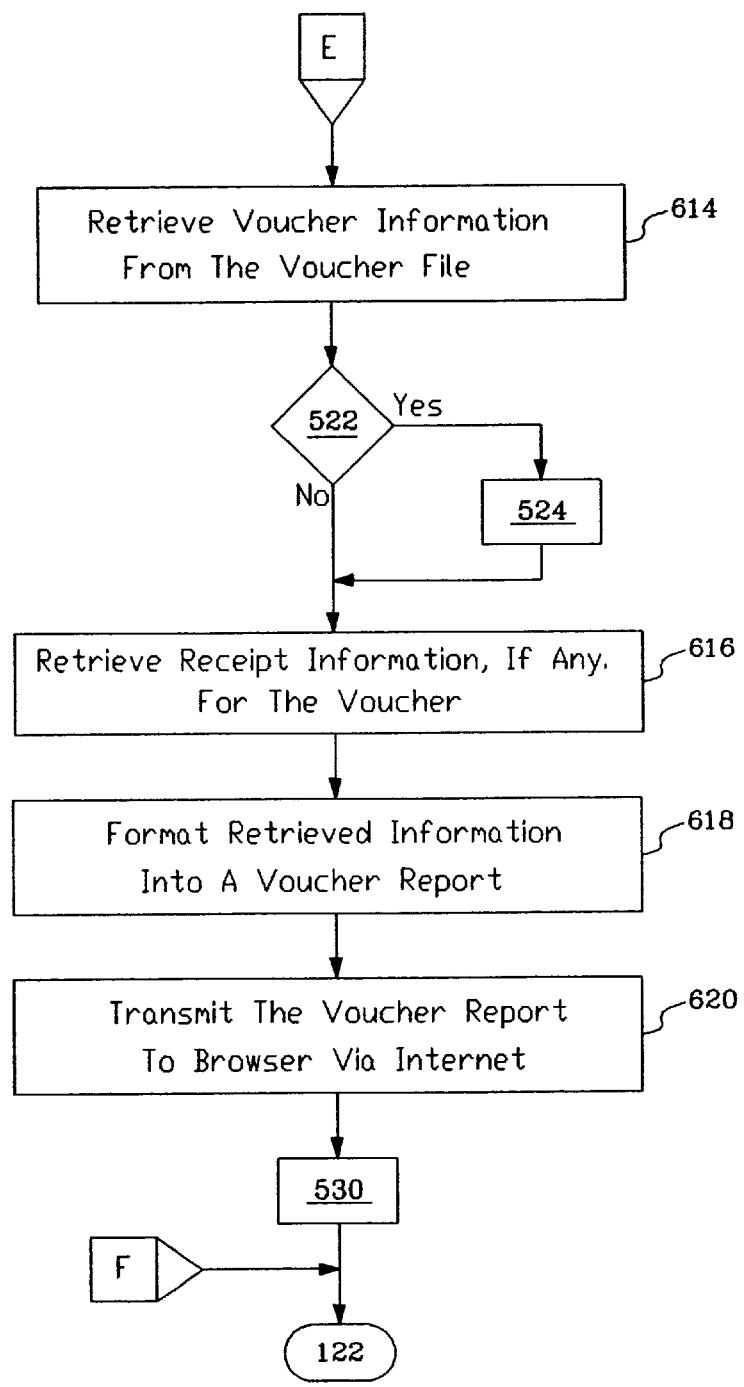

FIGS. 6A and 6B are flow diagrams of a voucher report processing 600 according to an embodiment of the invention. The voucher report processing 600 produces a voucher report. In one embodiment, the voucher report processing 600 is performed by the server machine.

The voucher report processing 600 initially receives 602 a voucher report request from the Internet browser application on the client machine via the Internet. A return data channel and a database are then opened 504 and 506, as previously discussed above. Next, the voucher report request is parsed 604 to obtain a voucher number, a vendor identifier, and a hidden vendor identifier. A vendor identifier (retrieved vendor identifier) that corresponds to the voucher number is also retrieved from a voucher file.

Next, a decision block 608 determines whether the voucher file contains a voucher associated with the voucher number. When the decision block 608 determines that the voucher requested does not exist, then an error message is transmitted to the Internet browser application on the client machine. The error message in this case indicates that the voucher requested is not on file. Following block 610, the voucher report processing 600 is complete and processing returns to block 122 of the information access processing 100.

On the other hand, when the decision block 608 determines that the voucher requested does exist in the voucher file, then the decision block 516 determines whether the various vendor identifiers match 516 as previously discussed. When the various vendor identifiers do not match, an error message is transmitted to the Internet browser application on the client machine. In this case, the error message indicates that the voucher requested does not exist. Here, the failure of the vendor identifiers to properly match precludes the requester from gaining access to account information that is not associated with the authorized vendor number. Following block 612, the voucher report processing 600 is complete and processing returns to block 122 of the information access processing 100.

Alternatively, when the decision block 516 determines that all the vendor identifiers do properly match, then voucher information is retrieved 614 from the voucher file. The voucher information can include: voucher number, voucher status, amount, and amount paid. The voucher information may also include: associated purchase order number, associated invoice number, and associated invoice date. Next, blocks 522 and 524 operate to retrieve check information from the check file when the voucher status is "PAID" as previously discussed above.

Next, receipt information for the voucher is retrieved 616 from a receipt file in the database on the corporate financial computer if such information is available. Then, the retrieved information is formatted 618 into a voucher report. Thereafter, the voucher report is transmitted 620 to the Internet browser application on the client machine via the Internet. Next, the database on the corporate financial computer is closed 530 as previously discussed. Following block 530 in FIG. 6B, the voucher report processing 600 is complete and processing returns to block 122 of the information access processing 100.

Figure 9D:
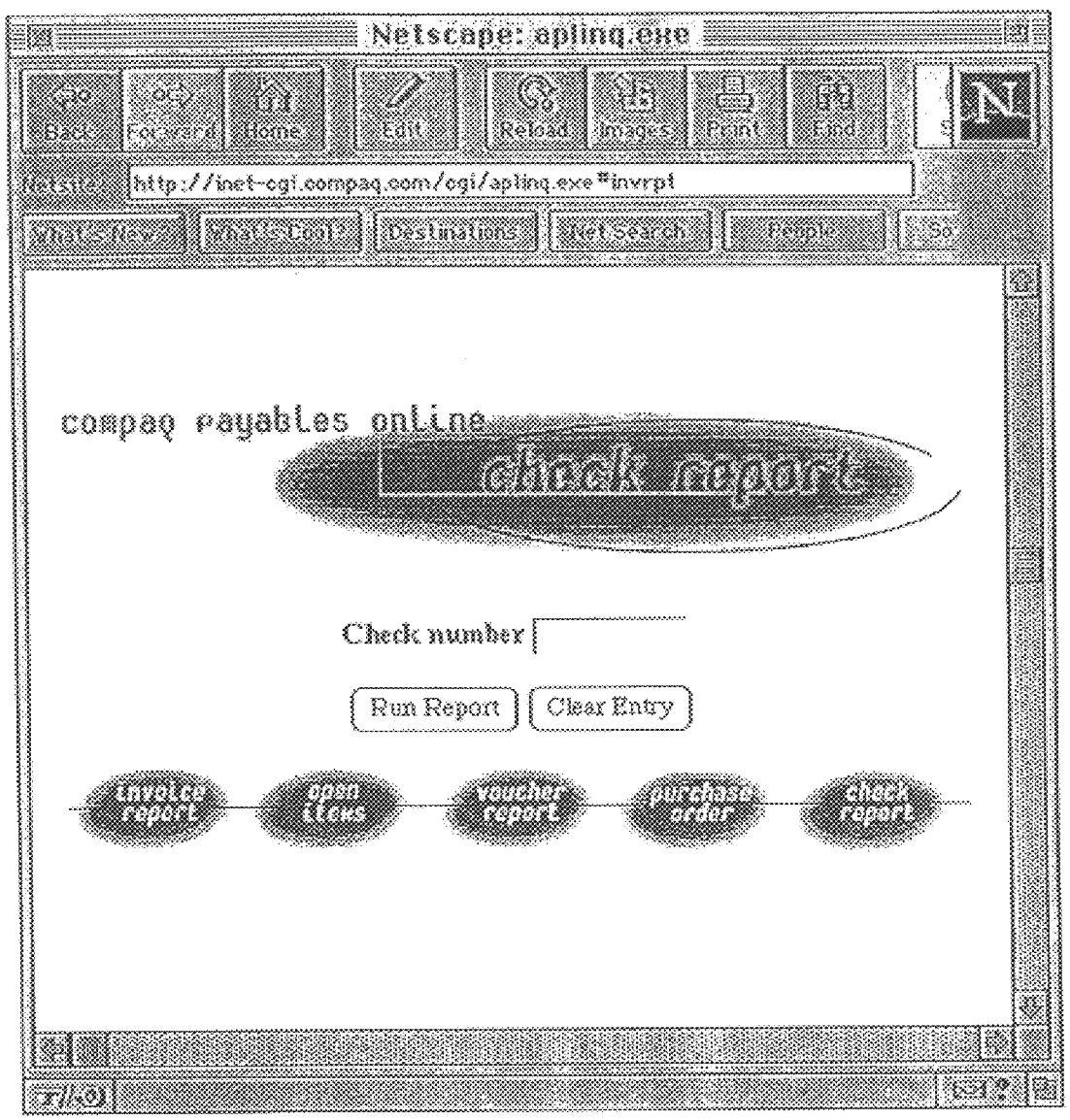
Figure 9E:
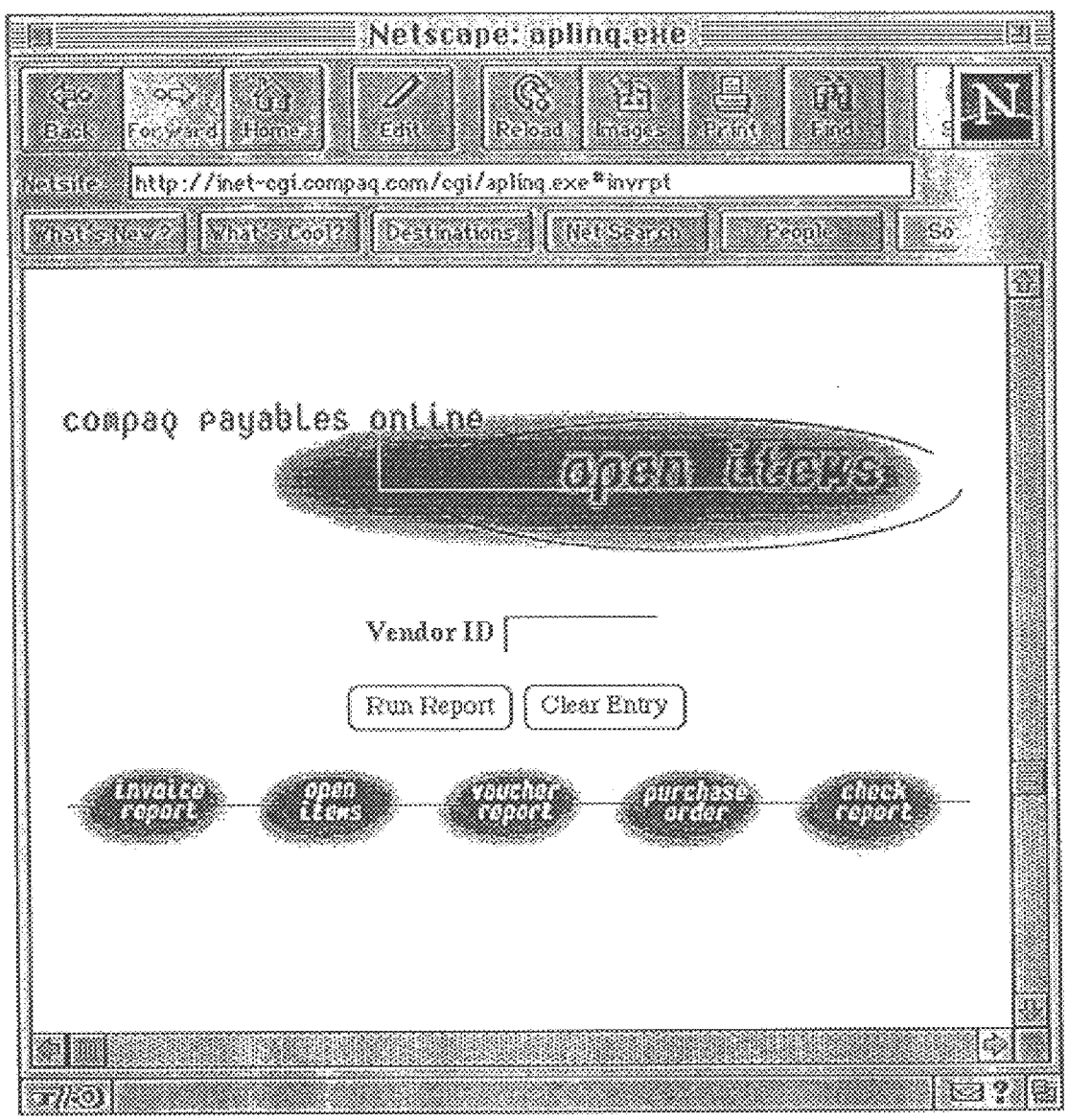
Figure 9F:
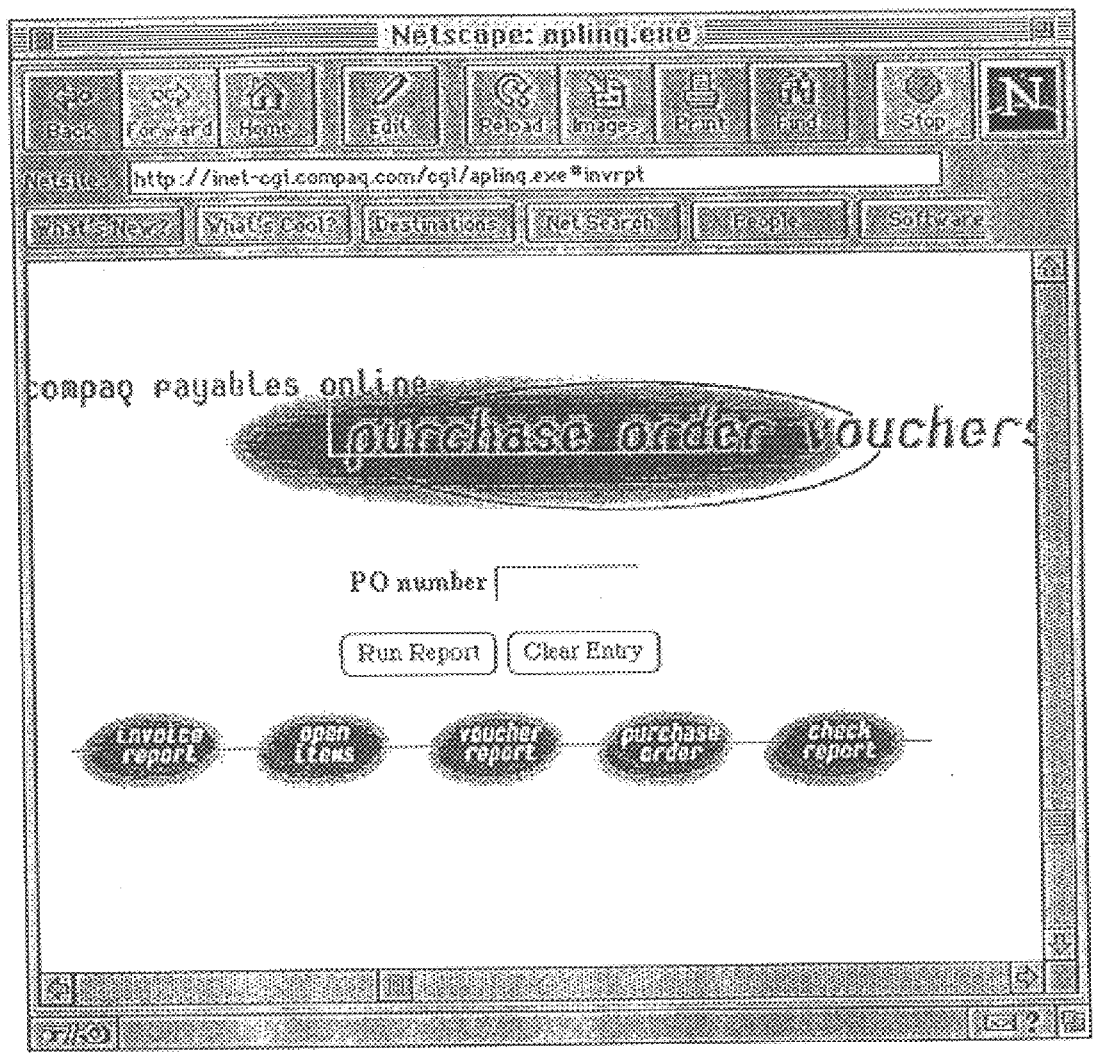
Figure 9G:
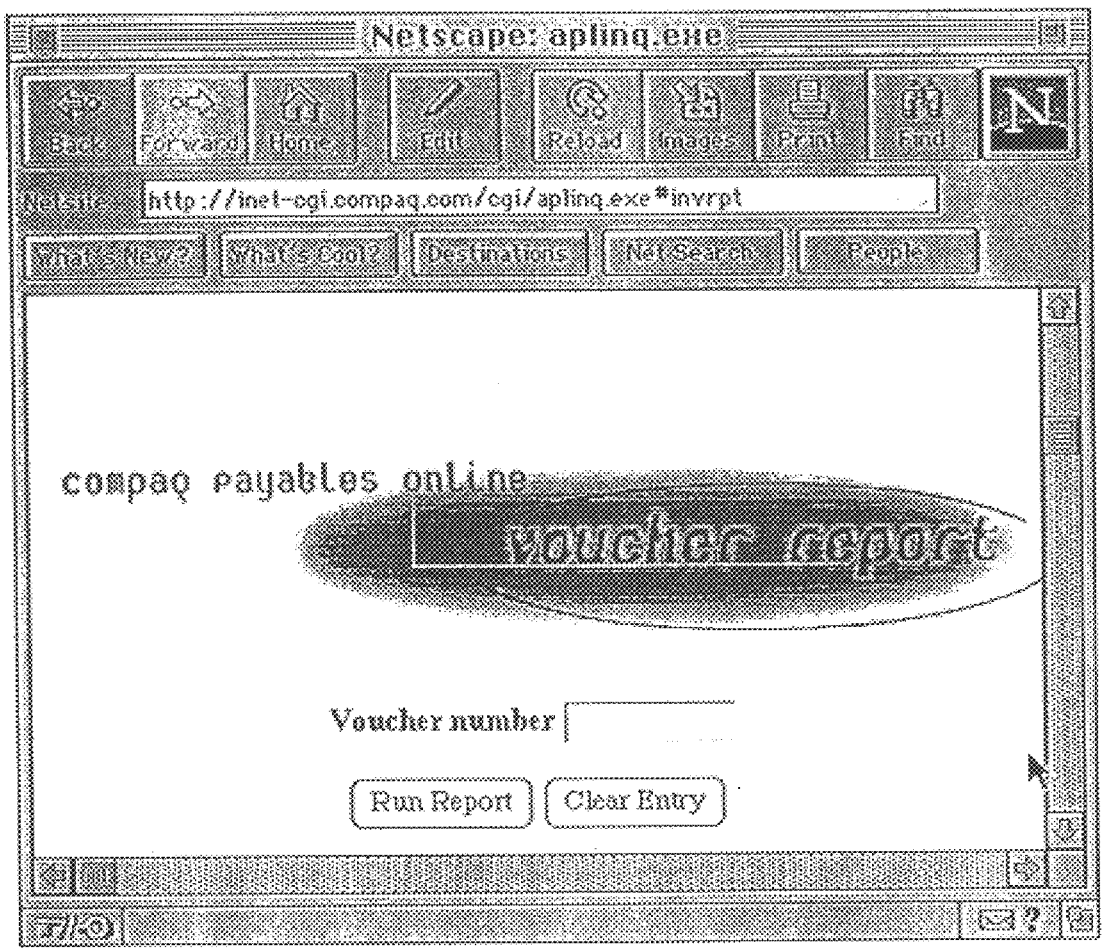

A voucher report can take many forms and include a variety of information. Normally, the voucher report will include various labels with amounts or identifiers associated with those labels. For example, labels and their amounts and identifiers typically would pertain to: a voucher number, a voucher status, an invoice number, an invoice date, a voucher amount, an amount paid, and check information if the voucher has been paid. FIGS. 9G and 10C are exemplary screen depictions displayed by an Internet browser application on the client machine. More particularly, FIG. 9G is an exemplary data entry screen for a voucher report, and FIG. 10C is an exemplary voucher report.

Figure 7A:
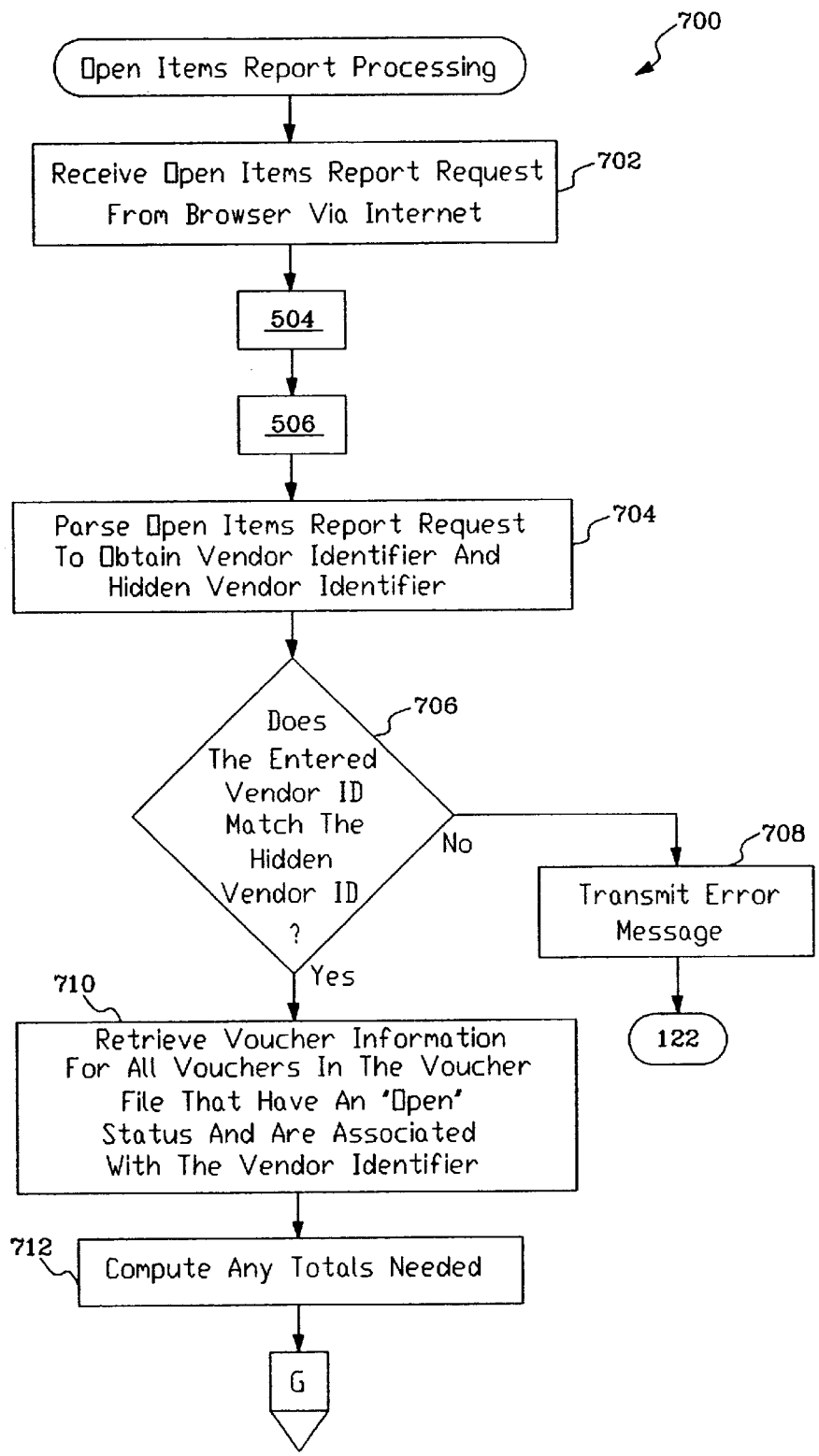
FIGS. 7A and 7B are flow diagrams of open items report processing according to an embodiment of the invention.
Figure 7B:
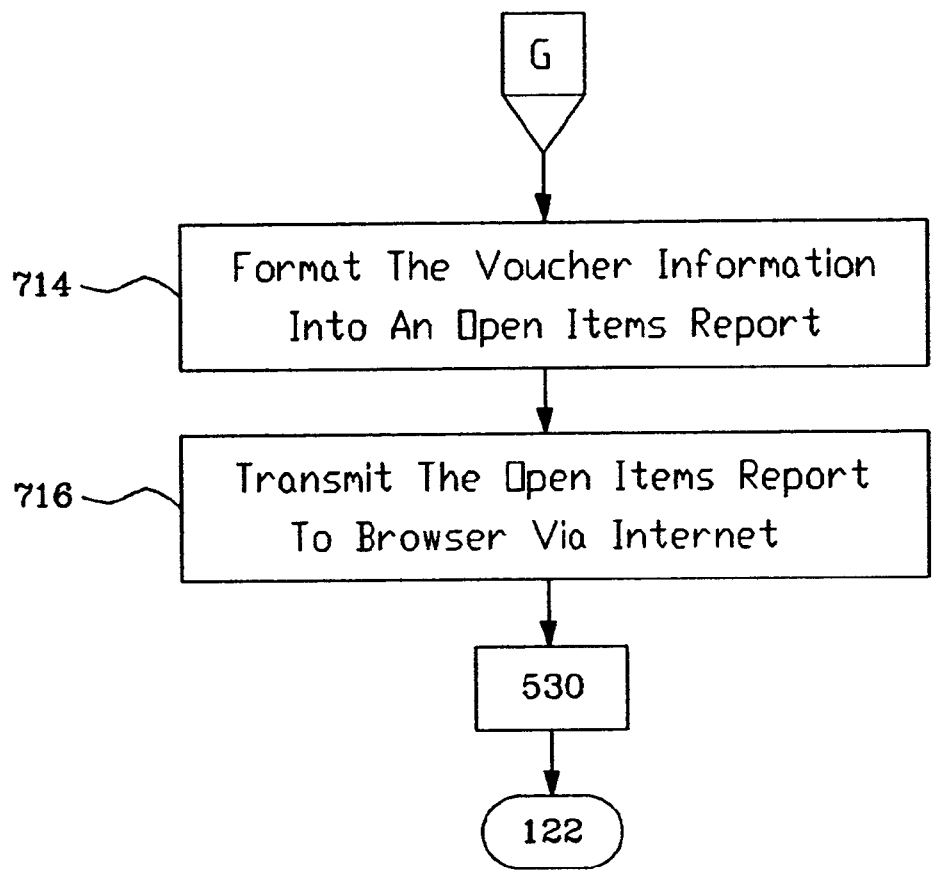

FIGS. 7A and 7B are flow diagrams of open items report processing 700 according to an embodiment of the invention. The open items report processing 700 produces an open items report. The open items report indicates those items being processed by the corporation that have not been fully processed. For example, invoices that a vendor provides to a corporation that are to be paid are given a voucher number when entered into the system for payment. However, these vouchers are open items because they are not completed until the vouchers have been paid by checks from the corporation. In one embodiment, the open items report processing 700 is performed by the server machine.

The open items report processing 700 initially receives 702 an open items report request from an Internet browser application via the Internet. Then, a return data channel and a database are opened 504 and 506 as previously discussed with reference to FIG. 5A. Next, the open items report request is parsed 704 to obtain a vendor identifier and a hidden vendor identifier.

A decision block 706 determines whether the entered vendor identifier matches the hidden vendor identifier. When the vendor identifiers do not properly match, then an error message is transmitted 708 to the Internet browser application on the client machine. In this manner, the authorized vendor that has successfully logged in and granted access to the system is nevertheless denied access to the account information or the generation of an open items report because the vendor identifier entered in requesting the report differs from the vendor identifier that has successfully logged in. Following block 708, the open items report processing 700 is complete because access has been denied and processing returns to block 122 of the information access processing 100. However, with respect to block 122 in this case, no desired report would be displayed but instead the error message would be displayed.

On the other hand, when the decision block 706 determines that the vendor identifiers do properly match, then voucher information is retrieved for all vouchers in the voucher file that have an "OPEN" status and are associated with the vendor identifier. Typically, this will produce a list of vouchers that are currently open. Next, totals may be computed 712 for the various categories of information. For example, the voucher information typically includes a voucher amount, and thus the total for the various vouchers can be computed 712 such that the open items report can provide totals to the requester. The voucher information is then formatted 714 to an open items report. Thereafter, the open items report is transmitted 716 to an Internet browser application on the client machine via the Internet. Then, the database is closed 530 as previously discussed, and processing returns to block 122 of the information access processing 100 where the desired report, namely the open items report, is displayed by the Internet browser application on the client machine via the Internet.

An open items report can take many forms and include a variety of information. Normally, the open items report will include various labels with amounts or identifiers associated with those labels. For example, labels and their amounts and identifiers typically would pertain to: a voucher number, an invoice number, an invoice date, purchase order number, a voucher amount, balance due, and various totals. FIGS. 9E and 10D are exemplary screen depictions displayed by an Internet browser application on the client machine. More particularly, FIG. 9E is an exemplary data entry screen for an open items report, and FIG. 10D is an exemplary open items report.

Figure 8A:
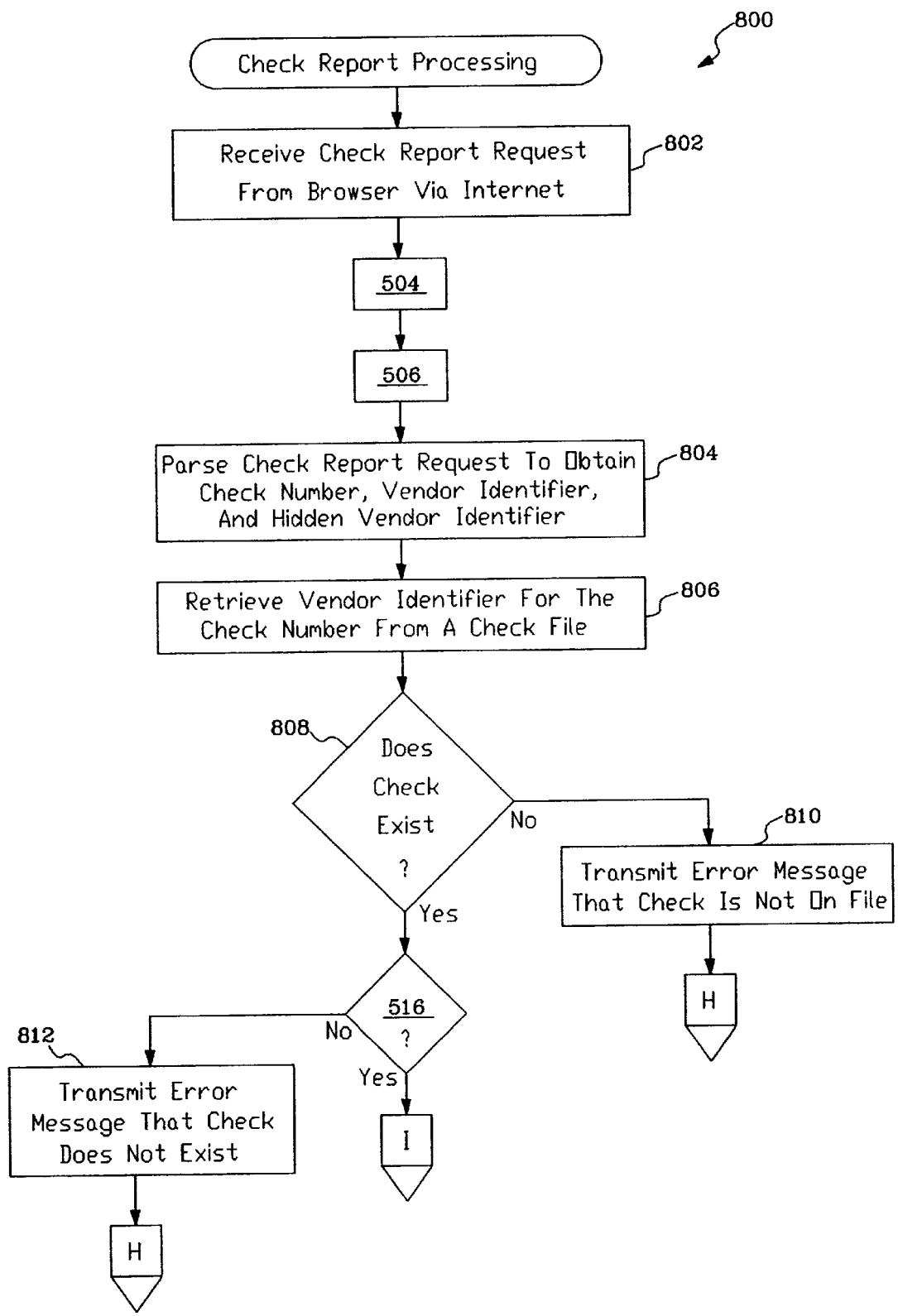
FIGS. 8A and 8B are flow diagrams of check report processing according to an embodiment of the invention.
Figure 8B:
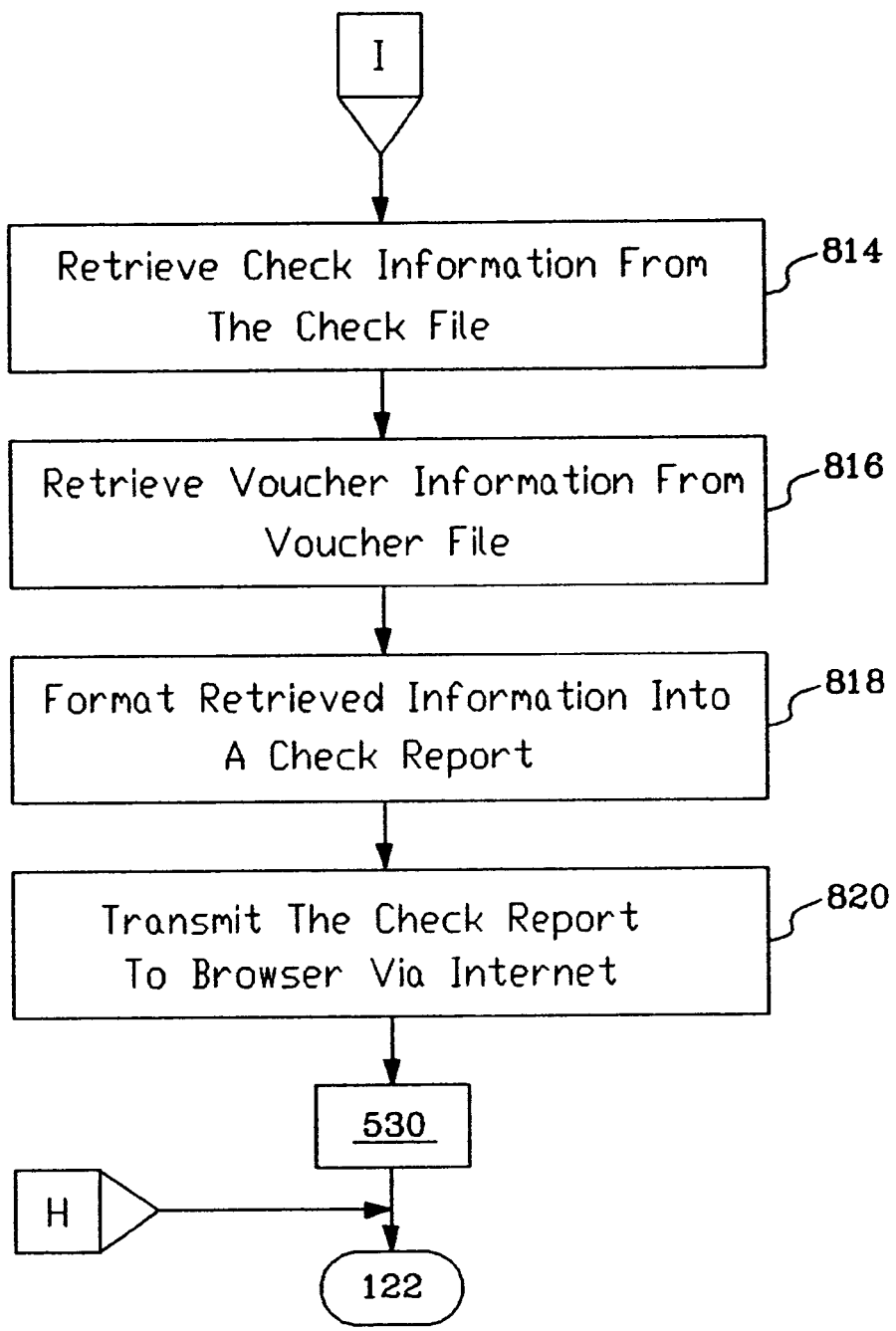

FIGS. 8A and 8B are flow diagrams of check report processing 800 according to an embodiment of the invention. The check report processing 800 produces a check report for a particular check. In one embodiment, the check report processing 800 is performed by the server machine.

The check report processing 800 initially receives 802 a check report request from the Internet browser application on the client machine via the Internet. Next, the return data channel and the database are opened 504 and 506 as previously discussed. The check report request is then parsed 804 to obtain a check number, a vendor identifier, and a hidden vendor identifier. Next, a vendor identifier associated with the check number is retrieved 806 from a check file of the database on the corporate financial computer.

A decision block 808 then determines whether the check exists. Here, if the check number provided in the check report request is not found in the check file, then the check does not exist. When the check does not exist, an error message is transmitted 810 to the Internet browser application on the client machine. In this case, the error message indicates that the check is not on file. Following block 810, the check report processing 800 is complete as the check report is not available to the requester, and processing returns to block 122 of the information accessing 100. In this case, the block 122 of the information access processing 100 will not display the desired report but will instead display the error message.

On the other hand, when the decision block 808 determines that the check does exist, the decision block 516 determines whether the retrieved vendor identifier matches both the vendor identifier provided with the report request and the hidden vendor identifier. When the vendor identifiers do not properly match, an error message is transmitted 812 to the Internet browser application of the client machine. The error message in this case indicates that the check does not exist. In other words, the requester of the check report is not permitted to receive such a check report because the vendor identifier associated with the check on which the report was requested does not belong to the vendor identifier that has been authorized to access the account information during the login process. Following the block 812, the check report processing 800 is complete and processing returns to block 122 of the information access processing 100 where the error message is displayed.

Alternatively, when the decision block 516 determines that the vendor identifiers do properly match, then processing continues to produce the check report. In particular, check information is then retrieved 814 from the check file. As an example, the check information can include: a check date, a cancel date, a check status, and a check amount. Further, voucher information may be retrieved 816 from the voucher file. Then, the retrieved information is formatted 818 into a check report. Once the check report has been formatted 818, the check report is transmitted 820 to the Internet browser application on the client machine via the Internet. The database is also closed 530 as previously described. Following block 530 in FIG. 8B, the check report processing 800 is complete and processing returns to block 122 of the information access processing 100 where the desired report, namely the check report, is displayed.

Figure 10B:
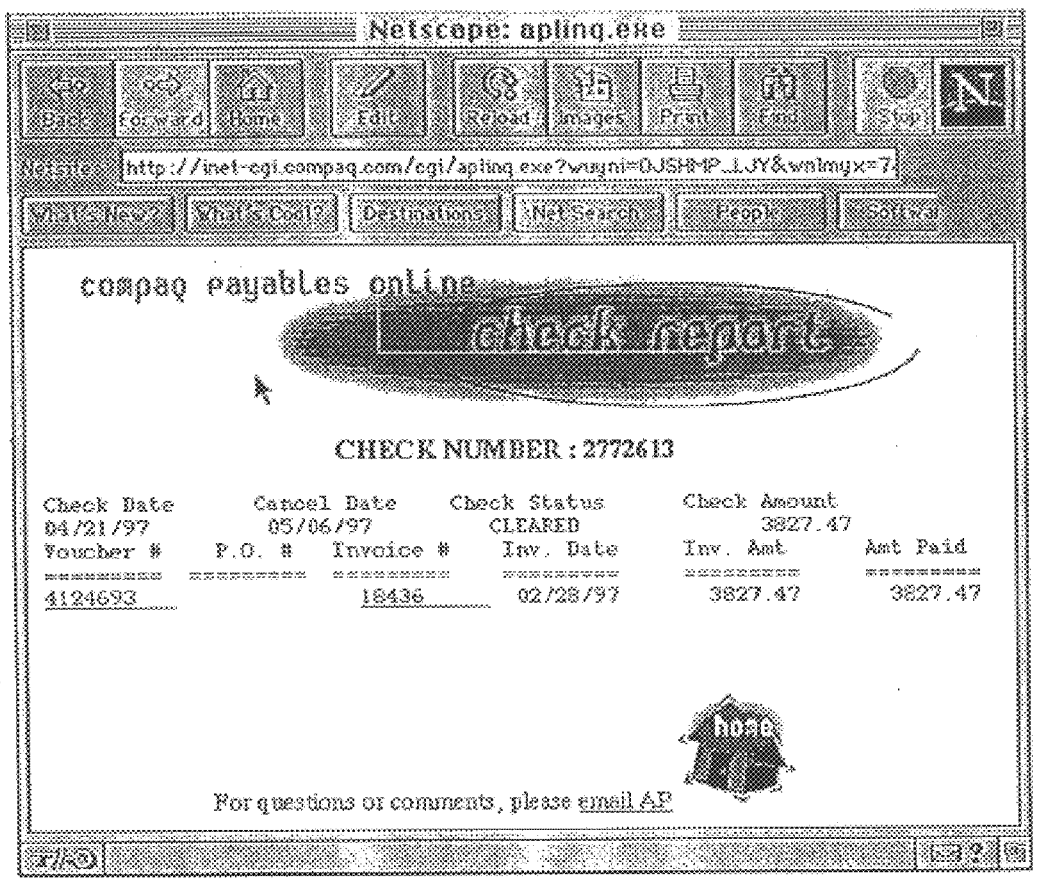

A check report can take many forms and include a variety of information. Normally, the check report will include various labels with amounts or identifiers associated with those labels. FIGS. 9D and 10B are exemplary screen depictions displayed by an Internet browser application on the client machine. More particularly, FIG. 9D is an exemplary data entry screen for a check report, and FIG. 10B is an exemplary check report.

Other reports can similarly be formed by processing similar to the processing discussed above with reference to FIGS. 5A–8B. Examples of other reports include a purchase order report and a combined vouchers and payables report. FIG. 9F is an exemplary data entry screen for a purchase order report.

The reports produced by invention may also include hyperlinks to other associated account information. In one embodiment, these hyperlinks are indirectly requests for other reports. For example, in FIG. 10A, the invoice report includes hyperlinks to the associated invoice and the associated check, with the hyperlinks being indicated by underlining. If the requester were to "click" on the check number "2772613" (a hyperlinked value) displayed in the invoice report shown in FIG. 10A, then in effect a request is made for a check report for that check number. Hence, the result would be the check report such as illustrated in FIG. 10B. Similarly, if the requester were to "click" on the voucher number "4124693" (a hyperlinked value) displayed in the invoice report shown in FIG. 10A, then in effect a request is made for a voucher report for that voucher number. Hence, the result would be the voucher report such as illustrated in FIG. 10C.

The account information from the business entity concerning vendors or suppliers that is contained in the reports produced and displayed to the requester can be downloaded and then imported into a spreadsheet. The downloading is facilitated by the Internet browser application, and the importing is facilitated by a spreadsheet application program.

The invention can also provide electronic notifications to vendors or suppliers that certain invoices are to be paid shortly or on a particular date. In one embodiment, the electronic notification is provided by an electronic mail message that can be manually or automatically sent to a predetermined electronic mail address after it is determined when payment of an invoice is to be made. This advance notification allows vendors or suppliers to pre-post their receivables and thus provide a cash forecast. In one embodiment, the electronic mail messages are produced by a notification program running on the corporate financial computer. The notification program searches for newly created checks to be issued (i.e., deposited) to vendors or suppliers shortly (e.g., in two business days), and for those checks that are found sends a electronic mail message to the electronic mail address on file from to the associated vendors or suppliers.

The advantages of the invention are numerous. One advantage of the invention is that the man power required to service incoming inquiries from vendors or suppliers regarding payment of their invoices is substantially reduced. Another advantage of the invention is that the account information is the actual or "live" account information of the business entity. As a result, the vendors or suppliers access account information that is always current. Another advantage of the invention is that vendors or suppliers are able to access account information of the business entity to determine the payment status of their invoices. Still another advantage of the invention is that the account information from the business entity concerning vendors or suppliers can be downloaded and imported into a spreadsheet. Yet another advantage of the invention is that a vendor can be electronically notified of the payment of an invoice prior to funding their account with said payment.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for enabling a vendor to access accounts payable information from a business entity financial computer over the Internet, said method comprising:
   (a) requesting, by a vendor client machine, access to an Internet server machine, the client machine and the Internet server machine being coupled to the Internet, and the Internet server machine having a secure connection to the business entity financial computer;
   (b) determining whether access is authorized;
   (c) displaying, at the client machine, an information selection screen offering a plurality of different report types of accounts payable information when access is determined to be authorized, wherein said displaying (c) of the information selection screen comprises:
      (c1) retrieving a template for the information selection screen;
      (c2) producing an information selection page from the template and predetermined configuration information for the account; and
      (c3) transmitting the information selection page to the client machine as the information selection screen;
   (d) selecting one of the different report types of accounts payable information;
   (e) displaying a data entry screen for the selected report type;
   (f) entering data for the selected report type using the data entry screen being displayed;
   (g) transmitting, to the server machine, a request for the selected report type in accordance with the data entered;
   (h) extracting, at the server machine, the requested accounts payable information from the business entity financial computer over the secure connection;
   (i) producing a report of the selected report type from at least a portion of the extracted accounts payable information;
   (j) forwarding the report produced from the server machine to the client machine; and
   (k) displaying, at the client machine, the report forwarded from the server machine, wherein said requesting (a), said selecting (d) and said entering (f) are operations performed by a requester, and wherein said displaying (c) further comprises:
      (c4) embedding a hidden requester identifier into the information selection page before said transmitting (c3).

2. A method for enabling a vendor to access accounts payable information from a business entity financial computer over the Internet, said method comprising:
   (a) requesting, by a vendor client machine, access to an Internet server machine, the client machine and the Internet server machine being coupled to the Internet, and the Internet server machine having a secure connection to the business entity financial computer;
   (b) determining whether access is authorized;
   (c) displaying, at the client machine, an information selection screen offering a plurality of different report types of accounts payable information when access is determined to be authorized, wherein said requesting (a) is initiated by a requester at the client machine, and wherein the information selection screen tat is displayed by said displaying (c) includes a hidden identifier embedded therein, the hidden requester identifier is the requester identifier that has been authorized for access bay said determining (b);
   (d) selecting one of the different report types of accounts payable information;
   (e) displaying a data entry screen for the selected report type;
   (f) entering data for the selected report type using the data entry screen being displayed;
   (g) transmitting, to the server machine, a request for the selected report type in accordance with the data entered;
   (h) extracting, at the server machine, the requested accounts payable information from the business entity financial computer over the secure connection;
   (i) producing a report of the selected report type from at least a portion of the extracted accounts payable information;
   (j) forwarding the report produced from the server machine to the client machine; and
   (k) displaying, at the client machine, the report forwarded from the server machine.

3. A method as recited in claim 2, wherein said transmitting (g) transmits the hidden requester identifier together with the request.

* * * * *